United States Patent [19]

Shimada et al.

[11] Patent Number: 5,028,509

[45] Date of Patent: * Jul. 2, 1991

[54] METHOD FOR CONVERTING RADIOGRAPHIC IMAGE, RADIATION ENERGY STORAGE PANEL HAVING STIMULABLE PHOSPHOR-CONTAINING LAYER AND ALKALI HALIDE PHOSPHOR

[75] Inventors: Fumio Shimada; Akiko Kano; Koji Amitani; Hisanori Tsuchino; Naoko Nakamaru, all of Hino, Japan

[73] Assignee: Konica Corporation, Tokyo, Japan

[*] Notice: The portion of the term of this patent subsequent to May 1, 2007 has been disclaimed.

[21] Appl. No.: 344,543

[22] Filed: Apr. 25, 1989

Related U.S. Application Data

[63] Continuation of Ser. No. 151,809, Feb. 3, 1988, abandoned, which is a continuation-in-part of Ser. No. 946,696, Dec. 24, 1986, abandoned, and a continuation-in-part of Ser. No. 82,970, Aug. 4, 1987, abandoned, and a continuation of Ser. No. 775,021, Sep. 11, 1985, abandoned.

[30] Foreign Application Priority Data

| Sep. 14, 1984 | [JP] | Japan | 59-195146 |
| Sep. 14, 1984 | [JP] | Japan | 59-195147 |
| Sep. 14, 1984 | [JP] | Japan | 59-195148 |
| Sep. 14, 1984 | [JP] | Japan | 59-195149 |
| Sep. 18, 1984 | [JP] | Japan | 59-196366 |
| Sep. 18, 1984 | [JP] | Japan | 59-196367 |
| Dec. 28, 1985 | [JP] | Japan | 60-297516 |

[51] Int. Cl.$^5$ .................... G03B 42/00; G01T 1/202
[52] U.S. Cl. .................... 430/139; 252/301.4 H; 250/327.2; 250/484.1
[58] Field of Search ........... 252/301.4 H; 430/139; 250/367, 337, 327.2 A, 327.2 B, 327.2 C, 327.2 E, 327.2 F, 327.2 G, 327.2 H, 327.2 J, 327.2 L, 327.2 R, 484.1 R, 484.1 A, 484.1 B, 484.1 C

[56] References Cited

U.S. PATENT DOCUMENTS

| 3,975,637 | 8/1976 | Ikedo et al. | 250/327 |
| 4,079,258 | 3/1978 | Franz et al. | 250/483 |
| 4,089,799 | 5/1978 | Sommerdijk et al. | 252/301.4 H |
| 4,109,152 | 8/1978 | Aoki et al. | 252/301.4 H |
| 4,138,529 | 2/1979 | Mori et al. | 252/301.4 H |
| 4,293,634 | 10/1981 | Monosov | 430/269 |
| 4,507,379 | 3/1985 | Tsuchino et al. | 430/139 |
| 4,879,202 | 11/1989 | Hosoi et al. | 250/327.2 |
| 4,922,100 | 5/1990 | Takeuchi | 250/327.2 |

FOREIGN PATENT DOCUMENTS

| 0021342 | 7/1981 | European Pat. Off. . |
| 0029963 | 10/1981 | European Pat. Off. . |
| 0083085 | 6/1983 | European Pat. Off. . |
| 0095741 | 7/1983 | European Pat. Off. . |
| 0107192 | 2/1984 | European Pat. Off. . |
| 102051 | 3/1984 | European Pat. Off. . |
| 0104652 | 4/1984 | European Pat. Off. . |
| 0174875 | 3/1986 | European Pat. Off. . |
| 2507877 | 2/1976 | Fed. Rep. of Germany . |
| 1295615 | 5/1962 | France . |
| 1295615 | 5/1962 | France . |
| 2301088 | 10/1976 | France . |
| 2358745 | 10/1978 | France . |
| 2394 | 1/1978 | Japan . |
| 8302533 | 11/1983 | Netherlands . |
| 940917 | 11/1963 | United Kingdom . |
| 1462769 | 1/1977 | United Kingdom . |

Primary Examiner—Charles L. Bowers, Jr.
Assistant Examiner—Ashley I. Pezzner
Attorney, Agent, or Firm—Frishauf, Holtz, Goodman & Woodward

[57] ABSTRACT

Disclosed are a method for converting radiographic image which comprises the steps of:
(a) storing radiation energy-corresponding to a radiographic image in a stimulable phosphor of a panel comprising a stimulable phosphor-containing layer,
(b) scanning the layer with a stimulating ray to release the stored energy as a fluorescence, and
(c) detecting the fluorescence to form an image, wherein the stimulable phosphor is represented by the following formula:

$$(M_{1-x} \cdot M^I_x) X \cdot aM^{II}X'_2 \cdot bM^{III}X''_3 : dB$$

wherein M represents either Cs or Rb; $M^I$ represents at (Abstract continued on next page.)

least one of alkaline metals selected from the group consisting of Li, Na, K, Rb and Cs; $M^{II}$ represents at least one divalent meal selected from the group consisting of Be, Mg, Ca, Sr, Ba, Zn, Cd, Cu and Ni; $M^{III}$ represents at least one metal selected from the group consisting of Sc, Y, La, Ce, Pr, Nd, Pm, Sm, Eu, Cd, Tb, Dy, Ho, Er, Tm, Yb, Lu, Al, Ga and In; B is an activator which is at least one metal selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn and In; X, X' and X" each may by the same or different and represents a halogen atom selected from F, Cl, Br and I; provided that all of the X' atoms are the same halogen atoms; and x, a, b and d are numerals in the range of $0 \leq x \leq 1$, $0 \leq a \leq 1$, $0 \leq b \leq 0.5$ and $0 \leq d \leq 0.2$, respectively, and a radiation energy storage panel having a stimulable phosphor-containing layer characterized in that the stimulable phosphor comprises the compound having the above formula.

Also, disclosed is an alkali halide phosphor essentially free of Eu as an activator, characterized in that it contains oxygen.

65 Claims, 6 Drawing Sheets

METHOD FOR CONVERTING RADIOGRAPHIC IMAGE, RADIATION ENERGY STORAGE PANEL HAVING STIMULABLE PHOSPHOR-CONTAINING LAYER AND ALKALI HALIDE PHOSPHOR

This application is a Continuation of Ser. No. 07/151,809 filed Feb. 3, 1988 now abandoned, which is a continuation-in-part of Ser. No. 946,696 filed on Dec. 24, 1986, now abandoned and of Ser. No. 082,970 filed on Aug. 4, 1987, now abandoned, which is a continuation of Ser. No. 775,021 filed on Sep. 11, 1985, now abandoned, respectively.

BACKGROUND OF THE INVENTION

This invention relates to a method for converting radiographic image, a radiation energy storage panel having a stimulable phosphor-containing layer and a phosphor, more particularly, it is concerned with a method for converting radiographic image utilizing a stimulable phosphor, a radiation energy storage panel utilizing an alkali halide phosphor activated with thallium and the like, and an alkali halide stimulable phosphor.

Hitherto, there has been employed the so-called radiography using a silver salt for a radiation image, but there has now been desired a method for making a radiation image without using any silver salt.

Instead of the aforesaid radiography, there has been reviewed a method wherein radiation transmitted through the subject is absorbed in a phosphor, the phosphor is excited with a center energy to emit a radiation energy having accumulated in said phosphor as fluorescence and the fluorescence is detected to form an image. Illustratively, there has been proposed a method wherein a thermostimulable phosphor is used as a phosphor and a radiation image is converted by using a thermal energy as an exciting energy [see British Patent No. 1,462,769 and Japanese Provisional Patent Publication No. 29889/1976]. This conversion method is to employ a panel having a thermostimulable phosphor layer formed over a support, absorb a radiation transmitted through the subject into the thermostimulable phosphor layer of said panel so as to accumulate radiation energy upon strength and weakness of radiation, heat the thermostimulable phosphor layer to take out the accumulated radiation energy as a photosignal and then form an image upon strength and weakness of the luminescence. However, this method required heating for converting radiation energy to a photosignal and thus needed absolutely that the panel has a heat resistance without any modification or deformation by heat. Thus, there was a great restriction to a thermostimulable phosphor layer forming a panel, a raw material for a support and the like. There is thus seen a great difficulty in practical application with regard to this method for converting radiographic image using a thermostimulable phosphor as a phosphor and a thermal energy as an exciting energy. On the other hand, there has been also known another method for converting radiographic image wherein one uses a panel having a stimulable phosphor-containing layer placed over a support and as an exciting energy either or both of visible light and infrared light (see U.S. Pat. No. 3,859,527). This latter method may be said to be a more preferable method for converting radiographic image, in view of no heating required for converting the accumulated radiation energy to a photosignal as done in the former method and no need for heat resistance of a panel.

Among the phosphors employed in the aforesaid method for converting radiographic image, there have been known as a thermostimulable phosphor such phosphors as $LiF:Mg$, $BaSO_4:Mn$, $CaF_2:Dy$ and the like. Moreover, there have been known such phosphors as $KCl:Tl$ or $BaFX:Eu^{2+}$ type (X: Cl, Br, I) phosphor as disclosed in Japanese Provisional Patent Publication No. 75200/1984 as a stimulable phosphor using as an exciting energy a visible light or an infrared light.

Now, where the said method for converting radiographic image is to be applied to X-ray image conversion for medical diagnosis, the method is desirably of a high sensitivity as far as possible in order to reduce an exposed dose for patients, so that it is desired that the stimulable phosphor used for the method may show a high emmision luminance by stimulation as far as possible.

In the above-mentioned method, a reading speed for radiation image should be made higher for enhanced operation efficiency as a system and, therefore, a stimulable phosphor may desirably have a rapid response speed of stimulable emission to an exciting light.

In the above-mentioned method, a radiation energy storage panel is repeatedly used after elimination of the residual image formed by previous use; however, it is desirable that an elimination time for residual image should be short in said radiation energy storage panel and also that the stimulable phosphor used in the method should have a rapid elimination time for residual image.

However, the above stimulable phosphors are not completely satisfactory in all respects to stimulable emission luminance, response speed to stimulable emission and elimination speed for residual image and there has been desired an improvement in them.

Additionally, a reading apparatus for taking radiation image in the above methods should be desirably miniaturized, of a low cost and simplified and, thus, it is essential to use as an exciting light source a semi-conductor laser rather than a gas laser, e.g., an $Ar^+$ laser, an He-Ne laser and the like. Accordingly, it is desirable that the stimulable phosphor employed in this method should desirably have a stimulable exciting spectrum adaptable to an oscillating wave length (not less than 750 nm) of a semi-conductor laser.

However, the above stimulable phosphor does hardly exert a stimulable emmision to an oscillating wave length of a semi-conductor laser and thus there has been desired a longer wave length of a stimulable exciting spectrum.

As the alkali halide phosphor, there have been also known $CsI:Na$, $CsI:Tl$, $CsBr:Tl$, $RbBr:Eu$, $RbCl:Eu$, $KCl:Tl$, $LiF:Mg$ and the like. Among them, $CsI:Na$ or $CsI:Tl$ has been applied to I.I. tube for X-ray, while $CsBr:Tl$ has been tried for application to a similar use. Also, it is known that $RbBr:Eu$, $RbCl:Eu$ or $LiF:Mg$ be a thermostimulable phosphor and that $KCl:Tl$ may show a stimulable phenomenon.

It was seen that a stimulable phosphor may be utilized as an accumulated radiation energy storage panel by absorbing radiation transmitted through the subject, emitting as fluorescence the radiation energy having accumulated in the phosphor by irradiation with either or both of visible light with a longer wave length and infrared light and detecting said fluorescence to form a radiation image of the subject. But, when applied as such a radiation energy storage panel, the subjects may be frequently human beings, therefore, there is needed a less exposed dose to the subject as far as possible and there is desired as the phosphor therefor a phosphor having a higher stimulable emission efficiency. Further, a scanning time per one image element is practically about 10 usec from the relationship with a reading time and a resolving power and a readable area in a radiation energy storage panel and then there is desired a phosphor having a shorter shelf life of stimulable emission. And further, the afterglow from stimulable emission on reading, if any, may cause deterioration of a SN ratio and then there is desired a phosphor showing no such an afterglow phenomenon.

In the prior art, for obtaining a radiation image, the so called radiation photographic method by use of a silver salt has been utilized, but it has become desired to have a method for converting the radiation image into an image without use of a silver salt.

As a method substituting for the above radiation photographic method, there has been proposed the method in which the radiation transmitted through a subject is absorbed onto a phosphor, then the phosphor is excited with a certain kind of energy to radiate the radiation energy accumulated in the phosphor as luminescence, which luminescence is detected to form an image. As a specific method, there has been known a radiation image converting method wherein a panel having a stimulable phosphor layer formed on a support is used and one or both of visible ray and infrared ray is used as the excitation energy (U.S. Pat. No. 3,859,527).

The performances demanded for the stimulable phosphor to be used in the above radiation image converting method may include high intensity of stimulated luminescence so that the dose exposed may be smaller, rapid response speed of stimulated luminescence to the stimulating ray so that high speed reading may be possible, easiness in cancellation of remained images, and stimulation spectrum adaped to the oscillation wavelength of semiconductor laser (750 nm or longer) which can make the reading device small scale and low cost.

As a radiation image converting method by use of the stimulable phosphor satisfying these requisite performances, there is the radiation image converting method by use of an alkali halide phosphor as disclosed in Japanese Unexamined Patent Publication No. 72088/1986, etc.

In the above radiation image converting method, the operation to obtain a radiation image of a subject is performed by absorbing the radiation energy transmitted through the subject or emitted from the subject onto the stimulable phosphor constituting the radiographic image storage panel, scanning the radiographic image storage panel containing said stimulable phosphor with a laser beam to release the radiation energy accumulated as luminescence in time series, and detecting the luminescence Whereas, in a phosphor, there is generally observed luminescence emitted continuously even after stopping excitation, namely a phenomenon of afterglow, and such afterglow of stimulated luminescence is also seen similarly in the stimulable phosphor to be used for the radiographic image storage panel. While the stimulated luminescence to be detected is emitted from the picture element irradiated with the stimulating ray at a certain time point, afterglow of stimulated luminescence is emitted from all the picture elements scanned with the stimulating ray before said time point, and a part thereof is detected mixed with the stimulated luminescence to be detected, whereby the image obtained by the radiographic image storage panel containing such phosphor will be lowered in image quality.

The above trouble of afterglow of stimulated luminescence is improved in the alkali halide phosphor disclosed in Japanese Unexamined Patent Publications No. 73786/1986 and 73787/1986, but it cannot be said to be satisfactory yet, and it would be desirable to further improve the afterglow of stimulated luminescence characteristic of the alkali halide phosphor.

SUMMARY OF THE INVENTION

It is an object of the present invention to provide a method for converting radiographic image comprising absorbing a radiation transmitted through the subject in a stimulable phosphor, exciting the stimulable phosphor with an electromagnetic wave in the region of visible light and/or infrared light or ray to emit the accumulated radiation energy in the stimulable phosphor and detecting such a fluorescence, wherein there is employed a stimulable phosphor showing emission of a higher luminance with a higher sensitivity.

It is another object of this invention to provide a method for converting radiographic image which employs a stimulable phosphor having a rapid response speed of stimulable emission to an exciting light so that reading is possible at a high speed.

Another object of this invention is to provide a method for converting radiographic image with a short elimination time for residual image which employs a stimulable phosphor having a rapid elimination speed for residual image upon repeated uses.

A further object of this invention is to provide a method for converting radiographic image wherein there is used a stimulable phosphor having a broadened stimulable excited spectrum up to a near infrared region and a semi-conductor laser may be employable as an exciting light.

A still another object of this invention is to provide a method for converting radiographic image which employs an alkali halide type stimulable phosphor having a superior water-vapor resistance without any problem on reduction in an emission luminance by stimulation with lapse of time.

Further, an object of this invention is to provide a radiation energy storage panel which can satisfy the aforesaid objects.

The present invention has been accomplished on the basis of such a demand, and its object is to provide an alkali halide phosphor improved in afterglow characteristic of stimulated luminescence.

The present inventors have made various studies on a stimulable phosphor which may exert a stimulable emission with a higher luminance for meeting the aforesaid objects and also present no problem on reduced emission luminance by stimulation with time, and, as a result, it has been found that the present objects can be accomplished by a method of converting a radiographic image wherein it comprises the steps of:

(a) storing radiation energy-corresponding to a radiographic image in a stimulable phosphor of a panel comprising a stimulable phosphor-containing layer, (b) scanning said layer with a stimulating ray to release said stored energy as a fluorescence, and (c) detecting said fluorescence to form an image, wherein said stimulable phosphor is represented by the following formula [I]:

$$(M_{1-\chi} \cdot M^I_\chi) X \cdot aM^{II}X'_2 \cdot bM^{III}X''_3 \cdot cA:dB \qquad [I]$$

wherein M represents either Cs or Rb; $M^I$ represents at least one of alkaline metals selected from the group consisting of Li, Na, K, Rb and Cs; $M^{II}$ represents at least one divalent metal selected from the group consisting of Be, Mg, Ca, Sr, Ba, Zn, Cd, Cu and Ni; $M^{III}$ represents at least one metal selected from the group consisting of Sc, Y, La, Ce, Pr, Nd, Pm, Sm, Eu, Gd, Tb, Dy, Ho, Er, Tm, Yb, Lu, Al, Ga and In; A represents at least one metal oxide selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZnO_2$, $GeO_2$, $SnO_2$, $Nb_2O_5$, $Ta_2O_5$ and $ThO_2$; B is an activator which is at least one metal selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn and In; X, X' and X'' each may by the same or different and represent a halogen atom selected from F, Cl, Br and I; $\chi$, a, b, c and d are numerals in the range of $0 \leq \chi \leq 1$, $0 \leq a \leq 1$, $0 \leq b \leq 0.5$, $0 \leq c < 0.5$ and $0 < d \leq 0.2$, respectively.

The present inventors have studied variously about the alkali halide phosphor improved in afterglow characteristic of stimulated luminescence along the object of the present invention as mentioned above, and consequently accomplished the above invention by an alkali halide phosphor characterized by containing oxygen.

As an embodiment of the present invention, the above oxygen should preferably contained as an oxygen compound. Also, the above oxygen should be contained in an amount of oxygen atoms and/or oxygen ions of 0.5 mol or less, more preferably $10^{-6}$ mol to 0.2 mol, per 1 mol of the alkali halide in the alkali halide phosphor.

Also, it is preferable that Rb and/or Cs should be contained as the component in the alkali halide of said phosphor.

Further, as the activator, at least one metal selected from Tl, Na, Ag, Cu and In should be preferably contained.

DESCRIPTION OF THE PREFERRED EMBODIMENTS

The alkali halide stimulable phosphor having the composition according to this invention, when excited with an electromagnetic wave in the region of from visible to up to infrared, can exert a higher luminance of stimulable emission than the prior alkali halide type stimulable phoshor does and, moreover, there can be provided a method for converting radiographic image presenting no problem on lowered stimulable emission luminance with lapse of time.

The method for converting radiographic image of this invention may be practiced by the use of a radiation energy storage panel containing a stimulable phosphor having the above formula [I].

A radiation energy storage panel comprises basically a support or a base and at least one stimulable phosphor-containing layer provided over either side or both sides thereof. Generally, there is provided over the surface of the opposed side on a support to said stimulable phosphor-containing layer a protective layer for chemically or physically protecting said stimulable phosphor-containing layer. More specifically, the method for converting radiographic image according to this invention may be embodied by the use of a radiation energy storage panel comprising substantially a support and at least one stimulable phosphor-containing layer placed over the said support, wherein at least one layer of said stimulable phosphor layers contains a stimulable phosphor represented by the above formula [I].

The stimulable phosphor of the above formula [I], after absorbing such radiation as X-ray and the like, may exhibit a stimulable emission when irradiated with a light in the visible or infrared region, preferably a light in a wave length region of 500–900 nm (namely, an exciting light). Accordingly, a radiation transmitted the subject or emitted from the subject may be absorbed with the stimulable phosphor contained in the stimulable phosphor-containing layer of a radiation energy storage panel, proportionally to a radiation amount or dose, and the subject or radiation image thereof may be formed on said radiation energy storage panel as a latent image having accumulated therein a radiation energy. This latent image may show a stimulable emission proportional to the accumulated radiation energy by excitation with an exciting light having a wave length region of not less than 500 nm and then the latent image having accumulated therein a radiation energy may be made to a visible image by a photoelectric reading of said stimulable emission.

This invention will be more fully illustrated below by referring to the accompanied drawings.

Figure 1:
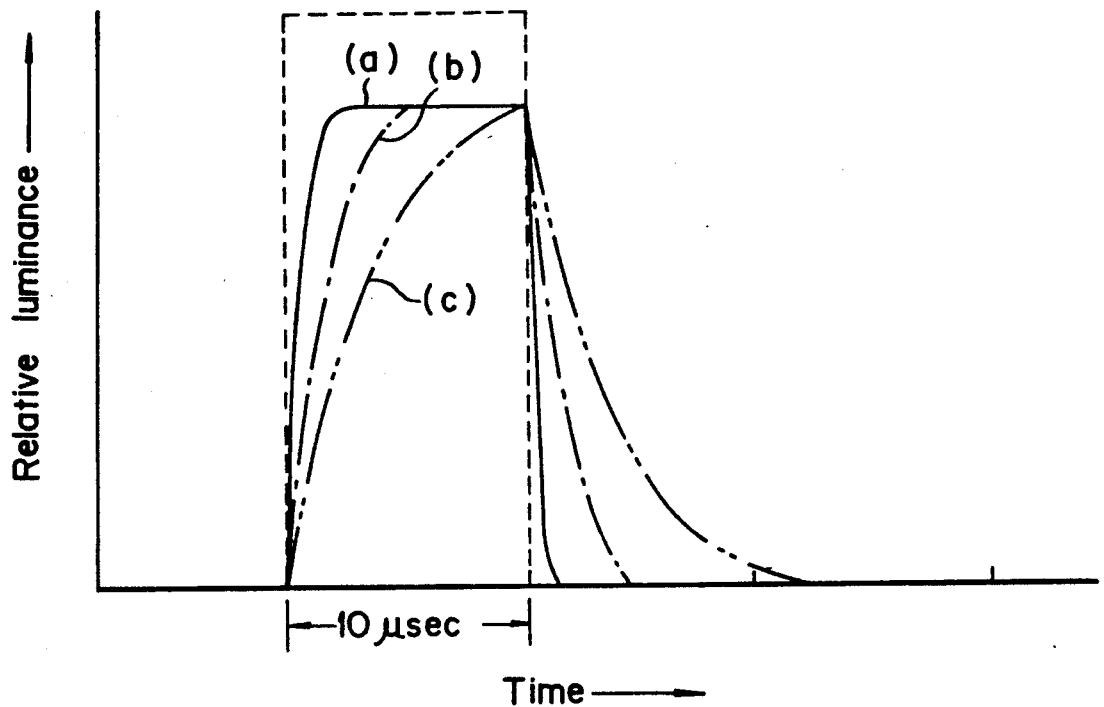
FIG. 1 shows response characteristics of a stimulable phosphor.

FIG. 1 shows the response characteristics to an exciting light by a stimulable phosphor represented by the above formula [I] which may be applied to the present method for converting radiographic image, as compared with the stimulable phosphor in the prior art method.

In FIG. 1, (a) indicates response characteristics to a exciting light by a stimulable phosphor employable for the present method for converting radiographic image, while (b) and (c) show, respectively, response characteristics of the prior art stimulable phosphor, BaFBr:Eu and BaFCl:Eu, a dotted line showing the state of an exciting light having a recutangularly variable strength.

As apparent form FIG. 1, a stimulable phosphor, which may be employed for the present method for converting radiographic image, has remarkably superior response characteristics to an exciting light, which may lead to a higher reading speed for radiation image, as compared with the prior art method.

Figure 2:
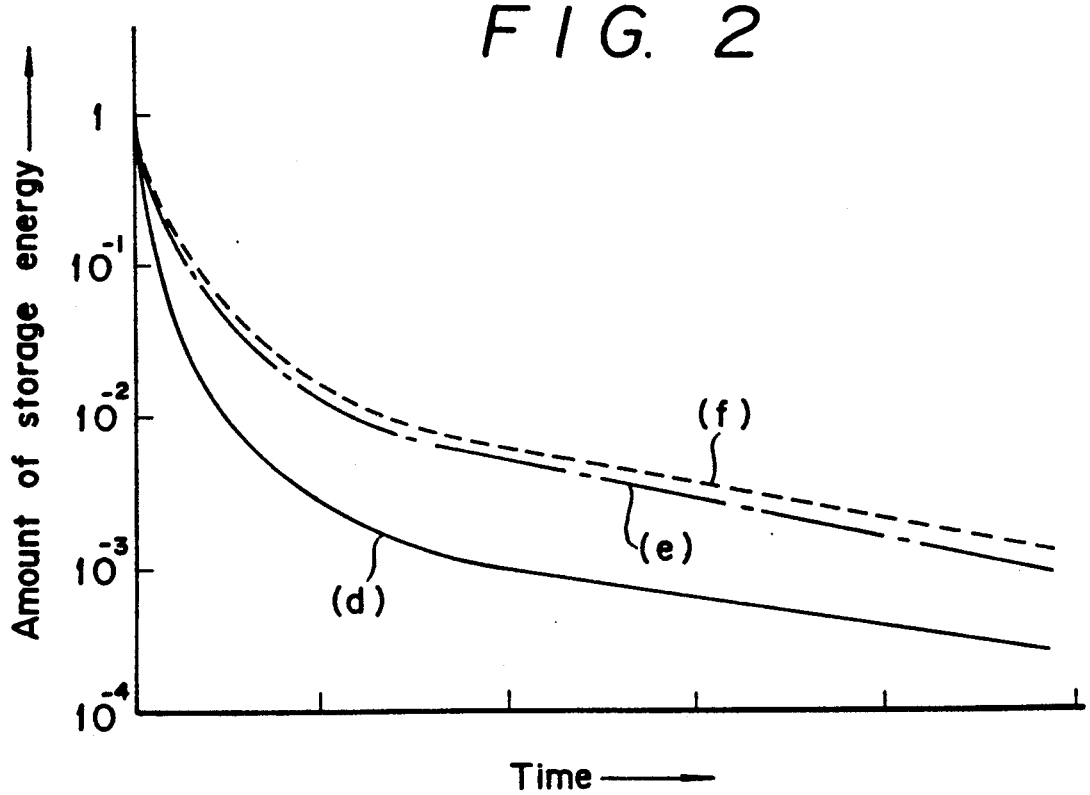
FIG. 2 shows residual image elimination characteristics of a stimulable phosphor.

FIG. 2 shows residual image elimination characteristics by a stimulable phosphor represented by the above formula [I] which may be employed for the present method for converting radiographic image, as compared with the stimulable phosphor in the prior art method.

In FIG. 2, (d) shows decay characteristics of accumulated energy as seen when a certain amount of radiation is irradiated to a stimulable phosphor employable for the method for converting radiographic image of the present invention and then the accumulated energy is eliminated with a tungsten lamp light, and (e) and (f) show, respectively, decay characteristics of accumulated energy when stimulable phosphors, BaFBr:Eu and BaFCl:Eu, employable for the prior art method are measured in the same manner as above.

As apparent from FIG. 2, the stimulable phosphor employable for the method for converting radiographic image of the present invention may exhibit a high decay speed of accumulated energy, which may lead to a more reduced time for eliminating residual image in comparison with the prior art method.

Figure 3:
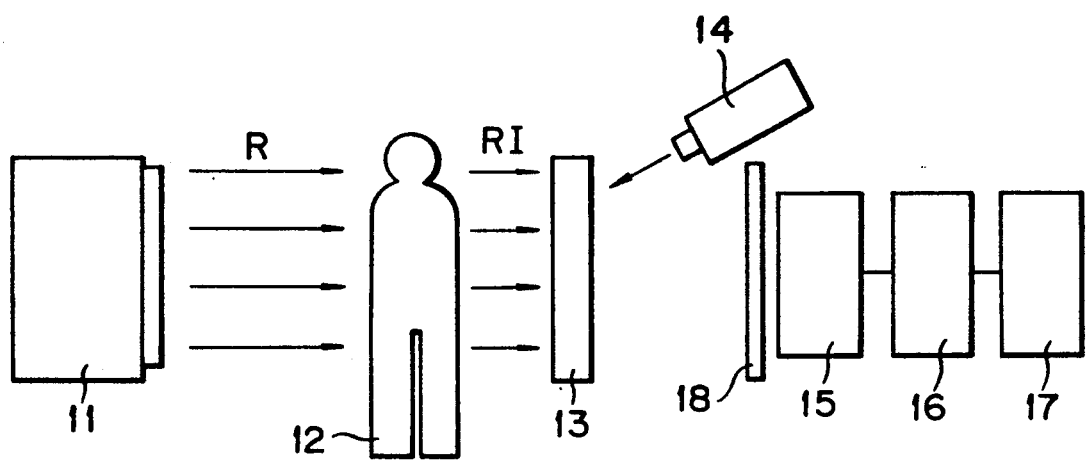
FIG. 3 is a flow sheet briefing an embodiment of the present method.

FIG. 3 shows an outlined embodiment wherein a stimulable phosphor represented by the above formula [I] is employed in the form of a radiation energy storage panel in the present method for converting radiographic image.

In FIG. 3, 11 is a radiation generating apparatus, 12 is the subject, 13 is a radiation energy storage panel which contains a visible or infrared light stimulable phosphor-containing layer having a stimulable phosphor of the above formula [I], 14 is an exciting light source emitting as fluorescence a radiation latent image of the radiation energy storage panel 13, 15 is a photoelectric conversion apparatus for detecting the fluorescence emitted from the radiation energy storage panel 13, 16 is a regenerating apparatus of a photoelectric signal detected with the photoelectric conversion apparatus 15 as image, 17 is an apparatus for representing the regenerated image and 18 is a filter for cutting a reflective light from a light source 14 and transmitting only the light emitted from the radiation energy storage panel 13. Though FIG. 3 shows the case where a radiation transmission image of the subject is to be formed, there is no particular need for the said radiation generating apparatus 11 if the subject 12 itself would emit radiation. Also, the apparatus after the photoelectric conversion apparatus 15 may be any of those wherein photosignal from the panel 13 could be regenerated as image in any form or shape without any limitation to the foregoing solely. As illustrated in FIG. 3, when the subject 12 is positioned between the radiation generating apparatus 11 and the radiation energy storage panel 13 and irradiated with radiation, radiation may transmit according to changes in radiation transmittance of each part in the subject 12 and the transmitted image (i.e., image upon strength and weakness of radiation) is entered into the radiation energy storage panel 13. This incident transmitted image is absorbed into a stimulable phosphor-containing layer of the radiation energy storage panel 13, whereby the number of electrons and/or positive holes could be generated proportionally to the radiation dose absorbed into the stimulable phosphor-containing layer and accumulated in trap level of the stimulable phosphor. Namely, there is formed a latent image having accumulated therein evergy from radiation transmission image. Subsequently, the latent image is actualized by excitation with photo-energy. Namely, the stimulable phosphor-containing layer is irradiated with a light source 14 emitting a light in visible or infrared region to drive out the electron and/or positive hole accumulated in trap level and emit accumulated evergy as fluorescence. Strength and weakness of the emitted fluorescence would be proportional to the number of accumulated electron and/or positive hole, i.e., strength and weakness of radiation evergy absorbed in the stimulable phosphor-containing layer of the radiation energy storage panel 13, the photosignal is converted to electric signal by means of a photoelectric conversion apparatus 15, e.g., a photomultiplier and regenerated as image by means of an image processing apparatus 16 and then the image is represented by means of an image representing apparatus 17. The image processing apparatus 16 is not only to regenerate electric signal simply as image signal but, more effectively, one can use the apparatus capable of accomplishing the so-called image processing, image operation, image memory, image storage and the like.

Also, where excited with photo-energy in the present method, there is a need to separate the reflective light from exciting light from the fluorescence emitted from the stimulable phosphor-containing layer and the photo-electric conversion apparatus receiving fluorescence emitted from the stimulable phosphor-containing layer is generally highly sensitive to photo-energy of a short wave length light of not more than 600 nm, so that fluorescence emitted from the stimulable phosphor-containing layer may desirably have a spectral distribution within a short wave length region as far as possible. The light emitted from the stimulable phosphor employable for the present method has a wave length region of 300–500 nm, while an exciting light has a wave length region of 500–900 nm; thus, the above-mentioned conditions may be simultaneously satisfied. More specifically, said stimulable phosphor employable for this invention shows the emission having a main peak of not more than 500 nm, which can be easily separable from an exciting light and coincide well with spectral sensitivity of the receiving apparatus to achieve an effective receipt of light, which can lead to an enhanced sensitivity of an image receiving system.

As the stimulable exciting light source 14 which may be employed for the present method, there may be used a light source involving a stimulable exciting wave length of the stimulable phosphor used for the radiation energy storage panel 13. Particularly, use of laser light may simplify an optical system and, in addition, a stimulable emission efficiency may be enhanced, because of a possible increase in strength of an exciting light, to give more satisfactory results. As the laser, there may be mentioned an He-Ne laser, an He-Cd laser, an Ar ion laser, a Kr ion laser, an $N_2$ laser, a YAG laser and a second harmonic wave thereof, a ruby laser, a semi-conductor laser, various pigment lasers, a metal vapour laser such as a copper vapour laser and the like. Usually, there may be preferably employed such continuous wave lasers as an He-Ne laser or an Ar ion laser, but there may be also used a pulse-oscillating laser if a scanning time in one image element of panel were synchronized with pulse. Further, where there is applied the method for separation utilizing emission delay as disclosed in Japanese Provisional Patent Publication No. 22046/1984 without using the filter 18, it is rather preferable to utilize a pulse-oscillating laser than modulation using a continuously oscillating laser.

Among the above-mentioned various laser light sources, a semi-conductor laser is particularly preferable, because it is small-sized and inexpensive and further there is no need to use a modulator.

As the filter 18, it may serve to transmit a stimulable emission emitted from the radiation energy storage panel 13 and cut an exciting light, therefore, it is determined upon a combination of a wave length of the stimulable emission from the stimulable phosphor contained in the radiation energy storage panel 13 with a wave length of the exciting light 14. For instance, in the case of a practically preferable combination of a stimulable exciting wave length 500–900 nm with a stimulable emission wave length 300–500 nm, there may be used as a filter, for instance, various purple to blue colored glass filters, e.g., C-39, C-40, V-40, V-42 and V-44 (available from Kabushiki Kaisha Toshiba), 7-54 and 7-59 (available from Corning Co., Ltd.), BG-1, BG-3, BG-25, BG-37 and BG-38 (available from Spectrofilm Co., Ltd.) and the like. Also, if an interference filter is applied, there may be selected and applied to some extent a filter having optional characteristics.

As the photoelectric conversion apparatus 15, there may be employed any of those capable of converting change in light amount to change in electric signal, for example, a photoelectric tube, a photomultiplier, a photodiode, a phototransistor, a solar cell, a photoconductive element and the like.

Next, the radiation energy storage panel, which may be employed for the present method for converting radiographic image, will be illustrated below.

The radiation energy storage panel, as explained above, is composed of a support or base and at least one layer of stimulable phosphor-containing layers containing a stimulable phosphor represented by the above general formula [I], said layer having placed over said support.

Among the stimulable phosphor [I], there may be preferably mentioned, with regard to a stimulable emission luminance, the phosphor of the general formula [I] wherein $M^I$ is preferably at least one alkali metal selected from Li, Na, K, Rb and Cs, more preferably, Rb, Cs, Na containing Rb and/or Cs and K containing Rb and/or Cs, particularly preferably at least one alkali metal selected from Rb and Cs. $M^{II}$ is preferably at least one alkaline earth metal selected from Be, Mg, Ca, Sr, and Ba. $M^{III}$ is preferably at least one trivalent metal selected from Y, La, Lu, Sm, Al, Ga, Gd and In. X, X' and X'' are preferably at least one halogen selected from F, Cl and Br. The value a for representing the content of $M^{II}X'$ and b for representing the content of $M^{III}X''_3$ are preferably selected from the range of $0 \leq a < 0.4$ and $0 \leq b \leq 10^{-2}$, respectively. Where the value a is a $< 0.5$, it is not preferable, in particular, owing to a rapid decrease in a stimulable emission luminance.

In the above general formula [I], the metal oxide A is preferably at least one MgO, $Al_2O_3$, $SiO_2$ and $TiO_2$. The value c for representing the content of A is preferably in the range of $0 \leq c \leq 0.2$.

Further, the activator B is preferably at least one metal selected from Eu, Tb, Ce, Tm, Dy, Ho, Gd, Lu, Sm, Y, Tl and Na, particularly preferably at least one metal selected from Eu, Ce, Sm, Tl and Na, more preferably, B comprises at least Tl. Also, the value d for representing an amount of the activator is preferably selected from the range of $10^{-6} < d \leq 0.1$ in view of a stimulable emission luminance.

There may be preferably employed the alkali halide phosphor represented by the above formula [I] in this invention.

The present alkali halide phosphor having the above composition is irradiated with radiation such as an X-ray, an ultra-violet ray, electron beam and the like and then stimulated and excited by irradiation with either or both of visible and infrared lights, whereby a clearly stronger stimulated excitation may occur, as compared with the alkali halide phosphor already known and worked in the same manner as above.

Also, where the present alkali halide phosphor having the above composition is irradiated with radiation such as X-ray, ultra-violet ray, electron beam and the like and then stimulated and excited by irradiation with either or both of visible and infrared lights at a rectangularly variable strength, a better response to stimulable excitation can be realized with a less afterglow of stimulation, as compared with the alkali halide phosphor already known and worked in the same manner as above.

The present stimulable phosphor $(M_{1X} \cdot M^I_X)X \cdot aM^{II}X'_2 \cdot bM^{III}X''_3 \cdot cA:dB$ can be prepared, e.g., according to the process as described below.

As a raw material for stimulable phosphor, there may be employed:

I) One or more of LiF, LiCl, LiBr, LiI, NaF, NaCl, NaBr, NaI, KF, KCl, KBr, KI, RbF, RbCl, RbBr, RbI, CsF, CsCl, CsBr and CsI;

II) One or more of $BeF_2$, $BeCl_2$, $BeBr_2$, $BeI_2$, $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaBr_2 \cdot 2H_2O$, $BaI_2$, $ZnF_2$, $ZnCl_2$, $ZnBr_2$, $ZnI_2$, $CdF_2$, $CdCl_2$, $CdBr_2$, $CdI_2$, $CuF_2$, $CuCl_2$, $CuBr_2$, $CuI$, $NiF_2$, $NiCl_2$, $NiBr_2$ and $NiI_2$;

III) One of more of $ScF_3$, $ScCl_3$, $ScBr_3$, $ScI_3$, $YF_3$, $YCl_3$, $YBr_3$, $YI_3$, $LaF_3$, $LaCl_3$, $LaBr_3$, $LaI_3$, $CeF_3$, $CeCl_3$, $CeBr_3$, $CeI_3$, $PrF_3$, $PrCl_3$, $PrBr_3$, $PrI_3$, $NdF_3$, $NdCl_3$, $NdBr_3$, $NdI_3$, $PmF_3$, $PmCl_3$, $PmBr_3$, $PmI_3$, $SmF_3$, $SmCl_3$, $SmBr_3$, $SmI_3$, $EuF_3$, $EuCl_3$, $EuBr_3$, $EuI_3$, $GdF_3$, $GdCl_3$, $GdBr_3$, $GdI_3$, $TbF_3$, $TbCl_3$, $TbBr_3$, $TbI_3$, $DyF_3$, $DyCl_3$, $DyBr_3$, $DyI_3$, $HoF_3$, $HoCl_3$, $HoBr_3$, $HoI_3$, $ErF_3$, $ErCl_3$, $ErBr_3$, $ErI_3$, $TmF_3$, $TmCl_3$, $TmBr_3$, $TmI_3$, $YbF_3$, $YbCl_3$, $YbBr_3$, $YbI_3$, $LuF_3$, $LuCl_3$, $LuBr_3$, $LuI_3$, $AlF_3$, $AlCl_3$, $AlBr_3$, $AlI_3$, $GaF_3$, $GaCl_3$, $GaBr_3$, $GaI_3$, $InF_3$, $InCl_3$, $InBr_3$, $InI_3$;

IV) An activator material of one or more of Eu compound group, Tb compound group, Ce compound group, Tm compound group, Dy compound group, Pr compound group, Ho compound group, Nd compound group, Yb compound group, Er compound group, Gd compound group, Lu compound group, Sm compound group, Y compound group, Tl compound group, Na compound group, Ag compound group, Cu compound group and Mg compound group; and V) one or more of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$.

In the case of the phosphor having the formula [I'], there may be employed, as the above-mentioned Tl compound, VI) One or more of such thallium compounds as TlF, TlCl, TlBr, TlI, $Tl_2O$, $Tl_2O_3$ and others.

Raw materials of the above-mentioned stimulable phosphor I)–V) are weighed so as to form a mixture composition of the formula [I]: $(M_{1-x}\cdot M^I_x)X\cdot aM^{II}X'_2\cdot bM^{III}X''_3\cdot cA:dB$ wherein stoichiometrically $0 \leq a \leq 1$, preferably $0 \leq a \leq 0.4$,
$0 \leq b \leq 0.5$, preferably $0 \leq b \leq 10^{-2}$,
$0 \leq c \leq 0.5$, preferably $0 \leq c \leq 0.2$, and
$0 \leq d \leq 0.2$, preferably $1^{-6} < d \leq 0.1$, and then mixed well by means of a mortar, a ball mill, a mixer mill and others.

Then, the resulting stimulable phosphor raw material mixture is charged into a heat-resistant vessel such as a quartz crucible or an alumina crucible and baked in an electric furnace. A baking temperature is suitably 500 to 1000° C. A baking period of time may be vaired depending upon an amount of the raw mixture charged, the baking temperature applied and others, but 0.5–6 hours may be generally suitable. As a baking atmosphere, there may be applied an oxidative atmosphere, or a neutral atmosphere such as a nitrogen gas atmosphere, an argon gas atmosphere and the like. There may be suitably applied an oxidative atmosphere containing 5 % or more volume of oxygen gas which also may contain non-reductive gas, such as nitrogen gas, an argon gas and the like. Moreover, a radiation luminance of the phosphor may be enhanced by taking out a baked product from the electric furnace after baked one under the above-mentioned baking condition, finely grinding it, charging the baked powder again into a heat resistant vessel, placing in an electric furnace and then annealing under the same baking condition as above. Also, when a baked product is cooled from the baking temperature to room temperature, the desired stimulable phosphor may be obtained by taking out the baked product from the electric furnace and allowing it to be cooled in air; however, a radiation luminance of the stimulable phosphor by stimulation may be more enhanced by cooling the said phosphor under the same oxidative atmosphere or neutral atmosphere as applied in baking. Further, a radiation luminance of the resultings by stimulation may be far more enhanced by moving the baked product from a heating portion to a cooling portion in an electric furnace to quench the phosphor in an oxidative atmosphere or a neutral atmosphere. Moreover, it is preferable for obtaining said stimulable phosphor raw material as a uniform mixture to prepare said material as an aqueous dispersion, in this instance, the dispersion is dried and then subjected to the above-mentioned baking.

After baking, the resultant stimulable phosphor is finely grinding and subsequently worked according to various procedures commonly adopted for preparing a phosphor such as washing, drying, screening, and so on to afford the stimulable phosphor of this invention.

An average particle diameter of the stimulable phosphor, which may be employed for the present radiation energy storage panel 13, may be optionally selected usually in the range of an average particle diameter of 0.1–100 μm, taking into consideration sensitivity and graininess of the radiation energy storage panel 13. More preferably, the phosphor with an average particle size of 1–30 μm may be used.

In the present radiation energy storage panel 13, the present stimulable phosphor may be generally dispersed in a suitable binder and coated over a support. As the binder, there may be usually applied those binders employed for laminating such as a protein, e.g., gelatin; a polysaccharide, e.g., dextran or gum arabic; a polyvinyl butyral; a polyvinyl acetate, a cellulose nitrate, an ethyl cellulose, a vinylidene chloride-vinyl chloride copolymer, a poly(methyl methacrylate), a vinyl chloridevinyl acetate copolymer, a polyurethane, a cellulose acetate butyrate, a polyvinyl alcohol and the like.

Generally, a binder may be employed in the range of 0.01 –1 part by weight per 1 part by weight of the stimulable phosphor. However, less binder is preferable for sensitivity and sharpness of the resulting radiation energy storage panel 13 and a range of 0.03–0.2 part by weight is more preferable in a further view of easiness in coating.

Moreover, there may be henerally placed in the present radiation energy storage panel 13 a protective layer physically or chemically protecting the stimulable phosphor-containing layer over an externally exposed surface of the stimulable phosphor-containing layer (i.e., an uncovered surface at the bottom of the phosphor layer base plate). The protective layer may be formed by direct coating of a coating liquid for the protective layer over the stimulable phosphor-containing layer or by adhesion of the protective layer previously and separately prepared over the stimulable phosphor-containing layer.

As a material for the protective layer, there may be employed those materials commonly used for the protective layer such as a cellulose nitrate, an ethyl cellulose, a cellulose acetate, a polyester, a polyethylene terephthalate and the like.

And further, if a protective layer may transmit a stimulable emission light and irradiation may be done from the protective layer side, there may be selected any of those capable of transmitting an excited light, with a preferable film thickness being approximately 2–40 μm.

One embodiment of the preparation of the radiation energy storage panel 13 will be illustrated hereinbelow.

First, a finely grinded stimulable phosphor, a binder and a solvent are admixed, kneaded well to prepare a coating liquid having uniformly dispersed therein the stimulable phosphor.

As the above-mentioned solvent, there may be mentioned, for instance, a lower alcohol such as methanol, ethanol, n-propanol, n-butanol and the like; a chlorine-containing hydrocarbon such as methylene chloride, ethylene chloride and the like; a ketone such as acetone, methyl ethyl ketone, methyl isobutyl ketone and the like; a lower ester such as methyl acetate, ethyl acetate, butyl acetate and the like; an ether such as dioxane, ethylene glycol monomethyl ether, ethylene glycol monoethyl ether and the like and these solvents may be employed in the form of a mixture thereof.

There may be further incorporated therein a wide variety of useful additives such as a dispersing agent to supplement dispersibility of the stimulable phosphor in a coating liquid, a plasticizer to ensure adhesion of the said phosphor particles with said binder after coating and drying.

As the dispersing agent, there may be mentioned, for example, phthalic acid, stearic acid, caproic acid or a lipophilic surface active agent and the like.

As the plasticizer, there may be mentioned, for example, a phosphoric acid ester such as triphenyl phosphate, tricresyl phosphate, diphenyl phosphate and the like; a phthalic acid ester such as diethyl phthalate, dimethoxyethyl phthalate and the like; a glycolic acid ester such ethyl phthalylethyl glycolate, butyl phthalylbutyl glycolate and the like; a polyethylene glycol-dibasic aliphatic acid polyester such as triethylene glycoladipic acid polyester, diethylene glycol-succinic acid polyester and the like; and others.

The coating liquid prepared as above may be uniformly coated over a support according to any coating methods commonly applied such as a roll coater method, a blade doctor method and so on to form the stimulable phosphorcontaining layer.

As the support or base which may be employed for this invention, there may be mentioned, for example, various synthetic resin sheets (e.g., sheets of a cellulose acetate, a polyester, a polyethylene terephthalate, a polyamide, a polyimide, a triacetate, a polycarbonate and the like), various metallic sheets (e.g., sheets of aluminum, aluminum alloy and the like), various paper sheets (e.g., sheets of baryta paper, resin coated paper, pigment paper and the like), various glass sheets and others.

A dry thickness of said stimulable phosphor-containing layer may be varied depending upon the purpose of utilization of the radiation energy storage panel as well as the sort of the stimulable phosphor, the proportion of the binder to the stimulable phosphor; a thickness of 10 $\mu m$ to 1000 $\mu m$ is suitable with 80 $\mu m$ to 600 $\mu m$ being preferable.

Still further, it may be suitable for increasing image sharpness formed in the radiation energy storage panel 13 to have dispersed a white powder in the stimulable phosphor-containing layer as disclosed, for instance, in Japanese Provisional Patent Publication No. 146447/1980, or it may be also suitable for increasing image sharpness of the stimulable phosphor-containing layer or absorbing a stimulable exciting light to make a proper coloration by having dispersed in the stimulable phosphor-containing layer a coloring agent capable of absorbing a stimulable exciting light as disclosed, for example in Japanese Provisional Patent Publication No. 163500/1980. Additionally, in order to improve sharpness and sensitivity of the radiation energy storage panel 13, it may be suitable to place a photoreflective layer between the base and the stimulable phosphor-containing layer as disclosed in Japanese Provisional Patent Publication No. 11393/1981.

In the present radiation energy storage panel, the phosphor layer may be provided over the support according to other methods, e.g., vacuum evaporation coating or sputtering than the above-mentioned coating methods. In this case, there is no need to apply a binder so that a packed density of the stimulable phosphor may be increased and one can obtain a favourable radiation energy storage panel with regard to sensitivity and resolving power thereof.

Figure 4:
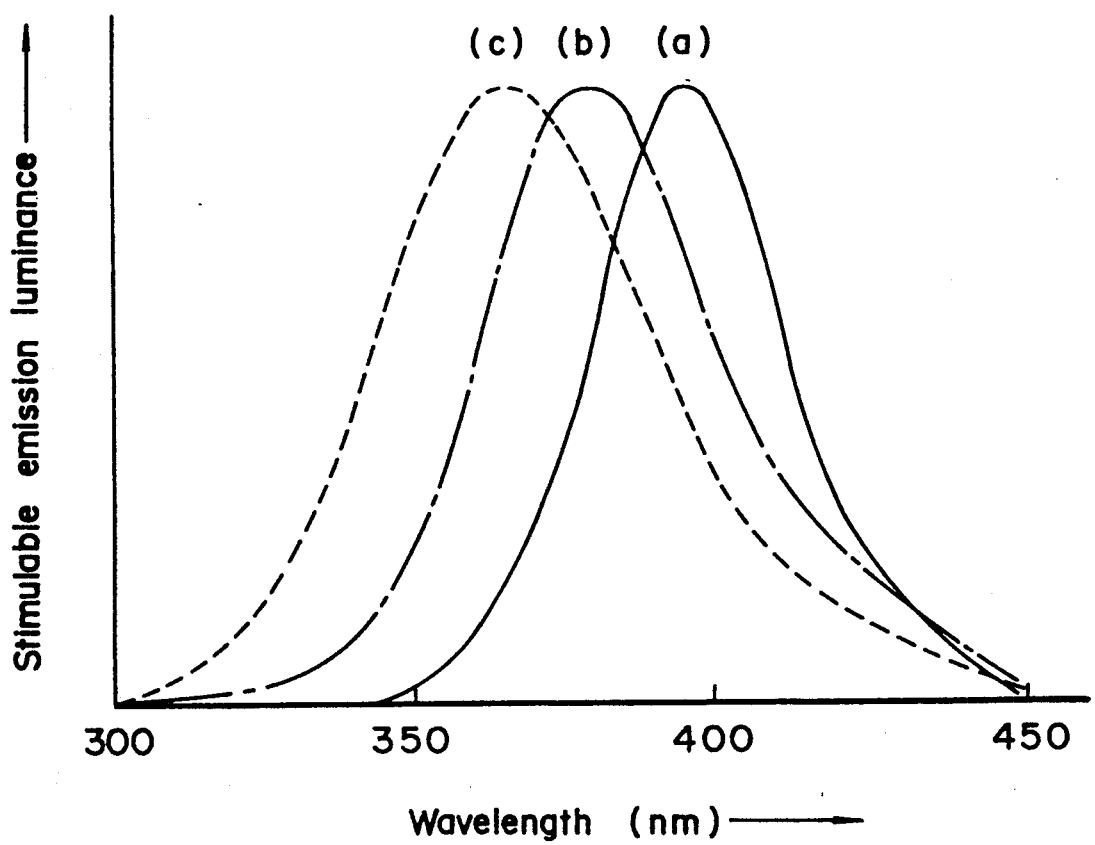
FIG. 4 shows a stimulable emission spectrum of the present stimulable phosphor sample.

In FIG. 4, there is illustrated an emission spectrum from stimulation of the so-obtained phosphor of the formula [I], $(M_{1-x}.M^I_x)X.aM^{II}X'_2.bM^{III}X''_3.cA:dB$ according to this invention. Its practical formulation is as defined below.

(a) RbBr.0.05BaFBr.0.01AlF$_3$:0.001Eu (b) 0.99RbBr.0.01CsF.0.05BaFCl 0.01LaF$_3$:0.001Tl (c) CsBr 0.05BaFCl.0.01YF$_3$:0.002Tl

These stimulable phosphors are irradiated with an X-ray of 80 KVp and the emission spectrum as shown is measured by exciting said phosphor with a semi-conductor laser having an oscillating wave length of 780 nm.

Figure 5:
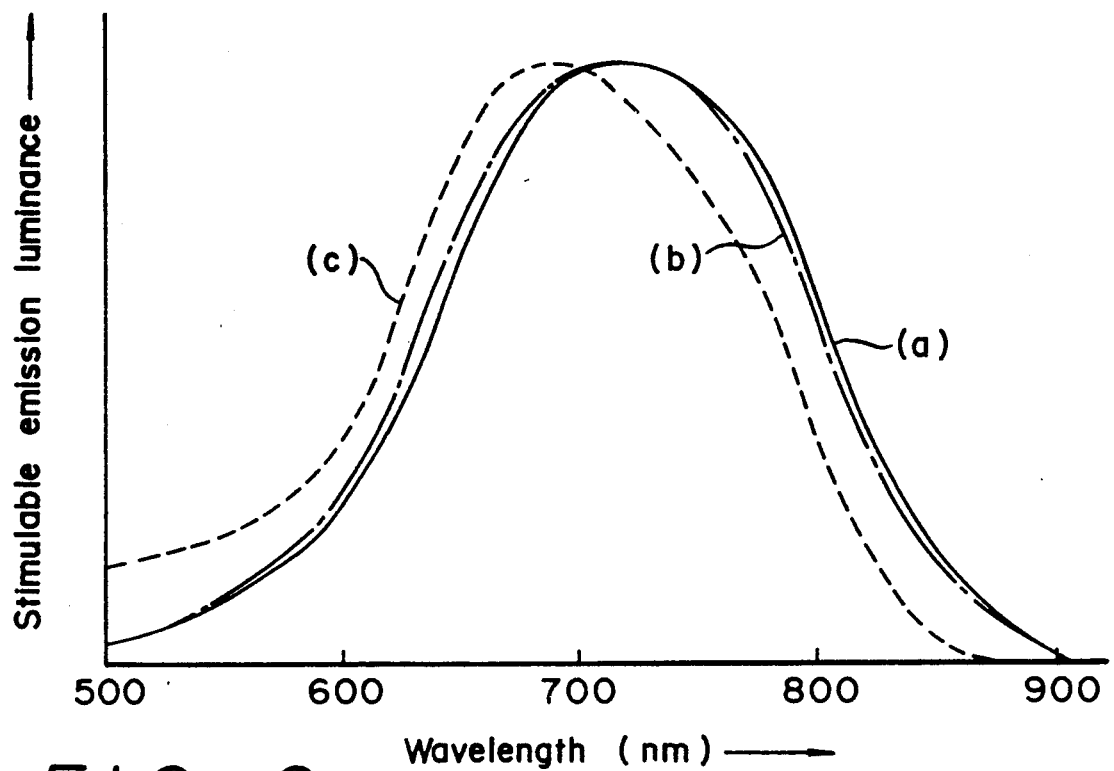
FIG. 5 shows an excited spectrum of the above phosphor sample.

Also, FIG. 5 illustrates an excited spectrum of the present phosphor $M^IX.aM^{II}X'_2.bM^{III}X''_3:dB$ by stimulation. Namely, said spectrum is an excited spectrum of each of the above-mentioned stimulable phosphors (a), (b) and (c) by stimulation.

Figure 6:
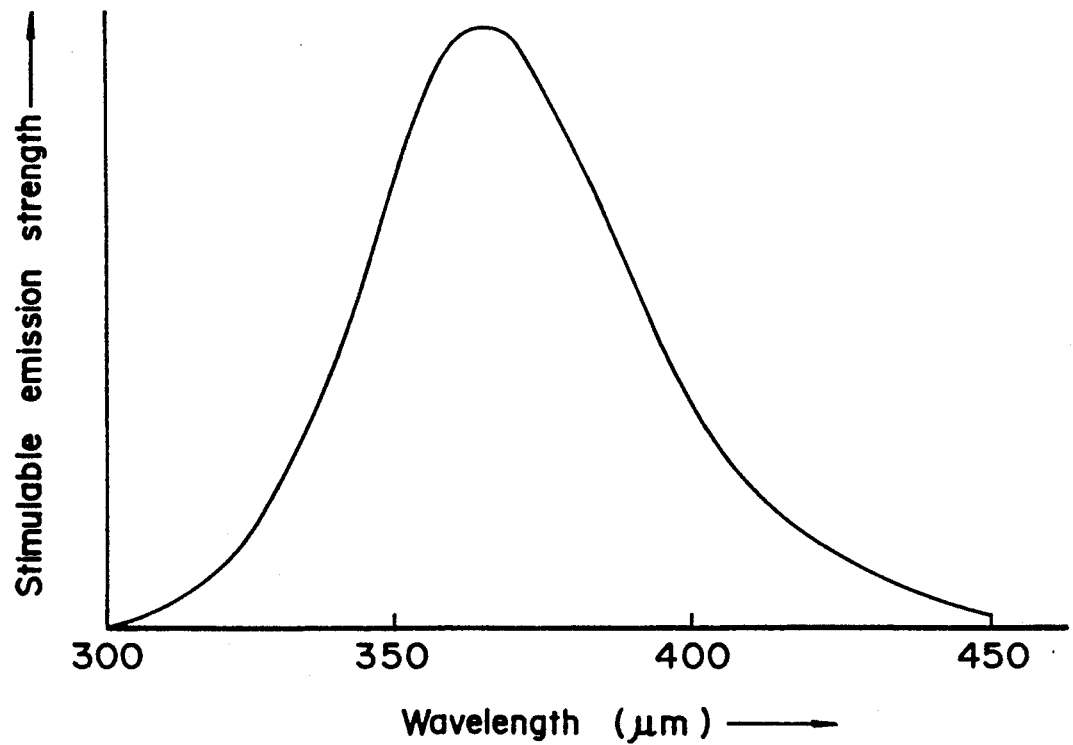
FIGS. 6 and 7 show stimulable emission spectra of one phosphor sample of this invention.
Figure 7:
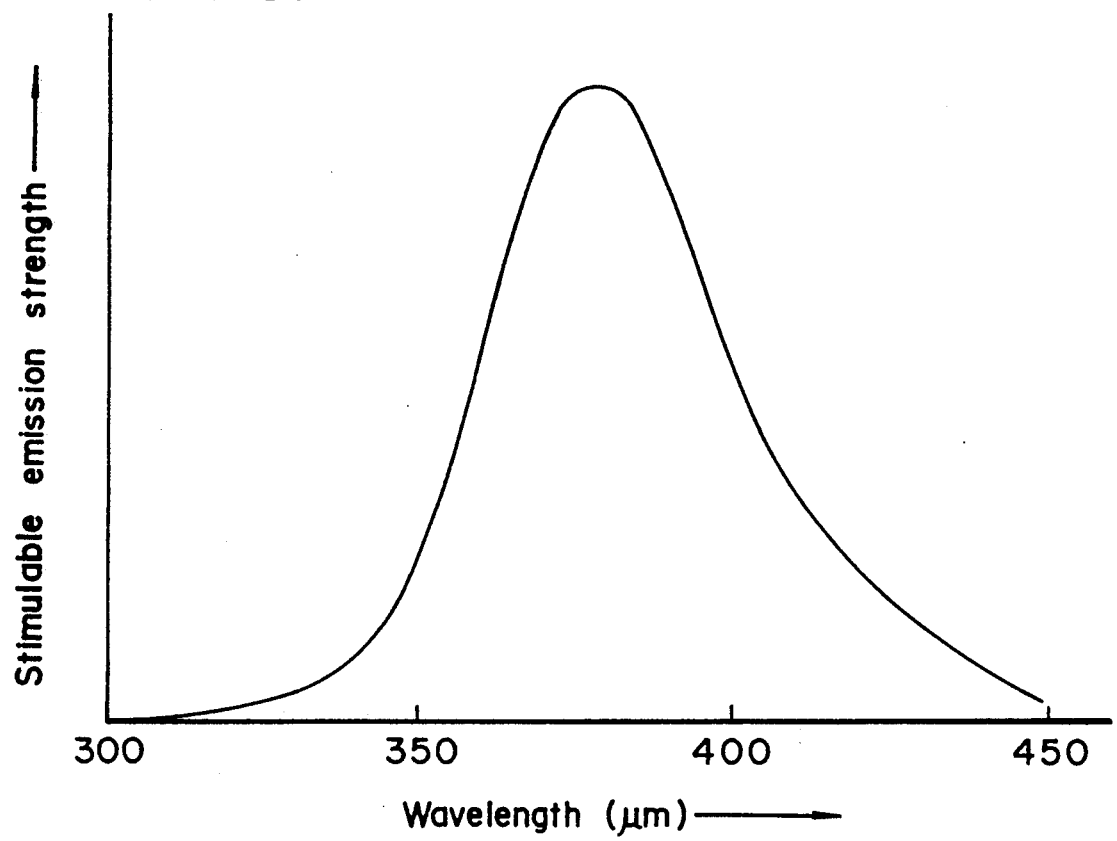

On the other hand, FIGS. 6 and 7 illustrate stimulable emission spectra of the present phosphors represented by the formula [I'], $(M_{1-x}.M^I_x)X.aM^{II}X'_2.bM^{III}X''_3:eTl.fA$, respectively. e and f are numerals in the range of $0 < e < 0.2$, $0 < f \leq 0.2$ and $0 < (e+f) = d \leq 0.2$. Their practical formulations are as defined below.

(d) 0.98CsBr 0.02RbI:0.002Tl (e) 0.97RbBr 0.03CsF:0.002Tl

Namely, said phosphors are irradiated with X-ray of 80 KVp and the emission spectrum as shown is measured by exciting said phosphor with a semi-conductor laser having an oscillating wave length of 780 nm.

Figure 8:
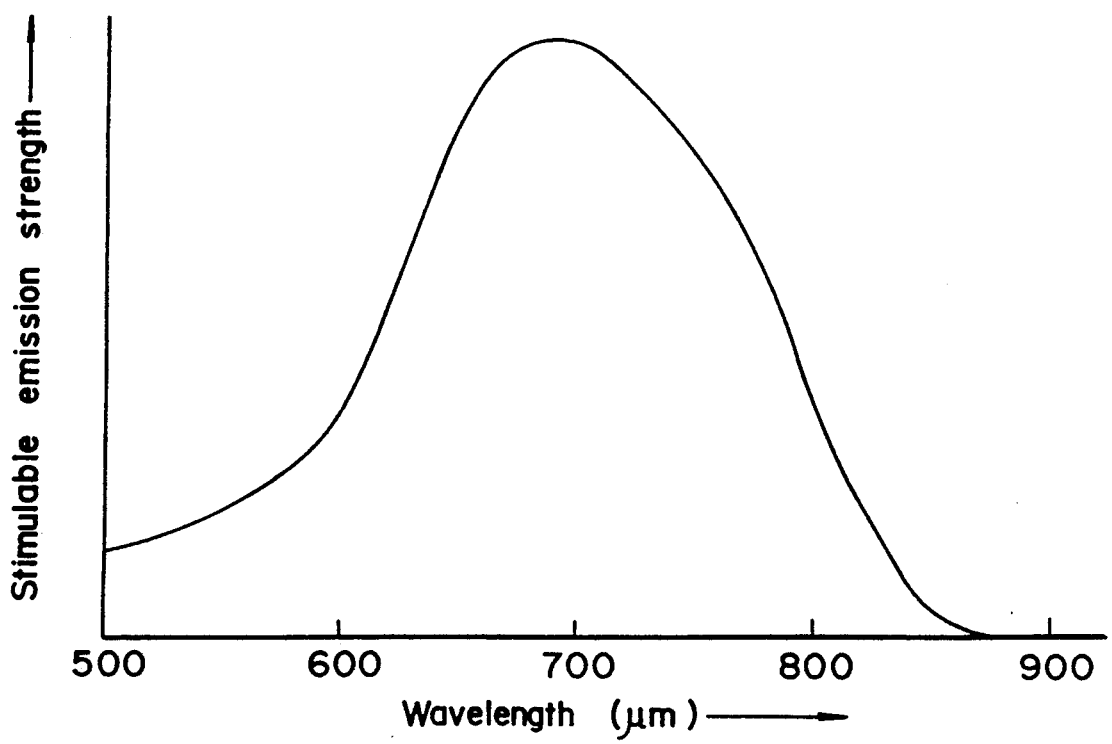
FIGS. 8 and 9 show stimulable excited spectra of the above phosphor sample.
Figure 9:
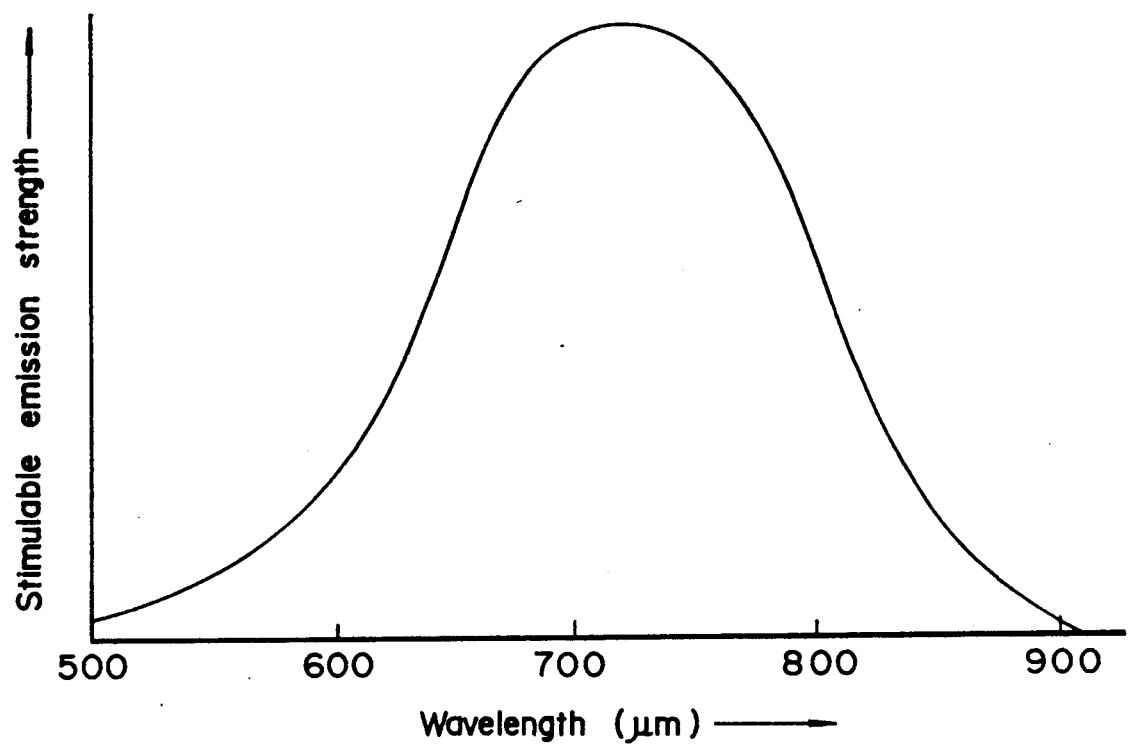

Further, FIGS. 8 and 9 show the stimulable emission spectra of the present phosphors, $(M_{1-x}.M^I_x)X.aM^{II}X'_2.bM^{III}X''_3:eTl.fA$, which spectra are stimulable excited spectra of said phosphors irradiated with X-ray of 80 KVp.

The alkali halide phosphor containing oxygen of the present invention as mentioned above can be obtained by, for example, carrying out calcination by use of compounds containing oxygen such as hydroxides, carbonates, sulfates, nitrates, oxides, etc., as a part of the phosphor starting material. More specifically, there may be employed, for example, the method in which an alkali metal compound containing oxygen such as KOH, Na$_2$CO$_3$, Rb$_2$SO$_4$, CsNO$_3$, Rb$_2$O, RbNO$_3$, etc., is added, or the method in which an activator is given in the form of a nitrate or an oxide such as TlNO$_3$, Tl$_2$O, etc.

Alternatively, the alkali halide phosphor of the present invention containing oxygen can be also obtained by carrying out calcination in an oxidative atmosphere when calcining an alkali halide phosphor from the phosphor starting materials.

When the alkali halide phosphor containing oxygen according to the present invention is irradiated with radiation such as X-ray, UV-ray, electron beam, etc., and then the above phosphor is subjected to stimulation by irradiation of one of visible light and infrared ray or both thereof so that the intensity may be changed to a rectangular shape, afterglow of stimulated luminescence is clearly smaller as compared with the case when similar operation is conducted by use of an alkali halide phosphor known in the art.

The stimulable phosphor of the present invention is described below by referring to the alkali halide phosphor shown by the following formula [I''] as an Example.

$$M^IX.aM^{II}X'_2.bM^{III}X''_3.cA:dB \qquad [I'']$$

In the above formula, $M^I$ is at least one alkali metal selected from Li, Na, K, Rb and Cs.

$M^{II}$ is at least one divalent metal selected from Be, Mg, Ca, Sr, Ba, Zn, Cd, Cu and Ni. $M^{III}$ is at least one trivalent metal selected from Sc, Y, La, Ce, Pr, Nd, Pm, Sm, Eu, Gd, Tb, Dy, Ho, Er, Tm, Yb, Lu, Al, Ga and In.

X, X' and X'' each represent at least one halogen selected from F, Cl, Br and I.

A is a compound having a composition containing oxygen, preferably at least one compound made from above $M^I$, $M^{II}$ and $M^{III}$, and further the activator B as described below.

B is at least one metal selected from Eu, Tb, Ce, Tm, Dy, Pr, Ho, Nd, Yb, Er, Gd, Lu, Sm, Y, Tl, Na, Ag, Cu, In and Mg or said metal, preferably a metal compound.

On the other hand, a is a numerical value in the range of $0 \leq a < 0.5$, b is a numerical value in the range of $0 \leq b$ <0.5, and c is a numerical value which is determined so that the content of oxygen atoms or oxygen ions contained in A is 0.5 mol or less, preferably $10^{-6}$ mol to 0.2 mol per 1 mol of the alkali halide in the alkali halide phosphor. d is a numerical value in the range of $0<d\leq0.2$. However, when the above A is an oxygen compound of the activator of the above B, d may be equal to 0.

In the case when oxygen is incorporated by calcining the alkali halide stimulable phosphor of the present invention in an oxidative atmosphere, the composition formula of said alkali halide stimulable phosphor is not limited to the above formula [I''].

For preparation of the above alkali halide stimulable phosphor, first as the stimulable phosphor starting materials, there may be employed:

I') at least one of LiF, LiCl, LiBr, LiI, NaF, NaCl, NaBr, NaI, KF, KCl, KBr, KI, RbF, RbCl, RbBr, RbI, CsF, CsCl, CsBr and CsI, II') at least one of $BeF_2$, $BeCl_2$, $BeBr_2$, $BeI_2$, $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaBr_2 \cdot 2H_2O$, $BaI_2$, $ZnF_2$, $ZnCl_2$, $ZnBr_2$, $ZnI_2$, $CdF_2$, $CdCl_2$, $CdBr_2$, $CdI_2$, $CuF_2$, $CuCl_2$, $CuBr_2$, $CuI_2$, $NiF_2$, $NiCl_2$, $NiBr_2$ and $NiI_2$, III') at least one of $ScF_3$, $ScCl_3$, $ScBr_3$, $ScI_3$, $YF_3$, $YCl_3$, $YBr_3$, $YI_3$, $LaF_3$, $LaCl_3$, $LaBr_3$, $LaI_3$, $CeF_3$, $CeCl_3$, $CeBr_3$, $CeI_3$, $PrF_3$, $PrCl_3$, $PrBr_3$, $PrI_3$, $NdF_3$, $NdCl_3$, $NdBr_3$, $NdI_3$, $PmF_3$, $PmCl_3$, $PmBr_3$, $PmI_3$, $SmF_3$, $SmCl_3$, $SmBr_3$, $SmI_3$, $EuF_3$, $EuCl_3$, $EuBr_3$, $EuI_3$, $GdF_3$, $GdCl_3$, $GdBr_3$, $GdI_3$, $TbF_3$, $TbCl_3$, $TbBr_3$, $TbI_3$, $DyF_3$, $DyCl_3$, $DyBr_3$, $DyI_3$, $HoF_3$, $HoCl_3$, $HoBr_3$, $HoI_3$, $ErF_3$, $ErCl_3$, $ErBr_3$, $ErI_3$, $TmF_3$, $TmCl_3$, $TmBr_3$, $TmI_3$, $YbF_3$, $YbCl_3$, $YbBr_3$, $YbI_3$, $LuF_3$, $LuCl_3$, $LuBr_3$, $LuI_3$, $AlF_3$, $AlCl_3$, $AlBr_3$, $AlI_3$, $GaF_3$, $GaCl_3$, $GaBr_3$, $GaI_3$, $InF_3$, $InCl_3$, $InBr_3$ and $InI_3$, IV') at least one of compounds containing oxygen, and V') at least one of activator starting materials of Eu compounds group, Tb compounds group, Ce compounds group, Tm compounds group, Dy compounds group, Pr compounds group, Ho compounds group, Nd compounds group, Yb compounds group, Er compounds group, Gd compounds group, Lu compounds group, Sm compounds group, Y compounds group, Tl compounds group, Na compounds group, Ag compounds group, Cu compounds group, In compounds group, Mg compounds group.

In $M^IX \cdot aM^{II}X'_2 \cdot bM^{III}X''_3 \cdot cA:dB$ represented stoichiometrically by the formula [I''], a is a numerical value in the range of $0\leq a<0.5$, preferably $0\leq a<0.4$, b is a numerical value in the range of $0\leq b<0.5$, preferably $0\leq b<10^{-2}$.

Further, c is a numerical value determined so that the content of oxygen atoms and/or oxygen ions contained in A may be 0.5 mol or less, preferably from $10^{-6}$ mol to 0.2 mol per 1 mol of the alkali halide in the alkali halide phosphor.

d is a numerical value in the range of $0<d\leq0.2$, preferably $10^{-6}\leq d\leq0.1$. However, when the above A is an oxygen compound of the activator of the above B, d may be equal to 0.

The above stimulable phosphor starting materials of I')-V') are weighed so that the mixture may have the mixed composition as described above, and thoroughly mixed by use of a mortar, a ball mill, a mixer mill, etc.

Next, the stimulable phosphor starting material mixture obtained is filled in a heat-resisting vessel such as the quartz crucible or alumina crucible, etc., and calcination is conducted in an electric furnace. The calcination temperature may suitably be 500 to 1000° C. The calcination time, which may differ depending on the filled amount of the starting material mixture, the calcination temperature, etc., may be generally suitably 0.5 to 10 hours.

The calcination atmosphere may be preferably neutral atmosphere such as nitrogen gas atmosphere, argon gas atmosphere, etc., or oxidative atmosphere. There may be suitably applied an oxidative atmosphere containing 5 % or more volume of oxygen gas which also may contain non-reductive gas, such as nitrogen gas, an argon gas and the like. If the mixture is once calcined under the above calcination conditions, the calcined product is then taken out from the electric furnace for pulverization, and then the calcined product powder is again filled in a heat-resisting vessel and placed in electric furnace to carry out re-calcination under the same calcination conditions as described above, the stimulated luminescence afterglow of the stimulable phosphor obtained can be made further smaller and the intensity of stimulated luminescence can be enhanced. Also, during cooling of the calcined product from the calcination temperature to room temperature, if the calcined product is cooled quickly in neutral atmosphere or oxidative atmosphere by moving it from the heating section to the cooling section in the electric furnace, the stimulated luminescence afterglow of the phosphor obtained can be made further smaller and the intensity of stimulated luminescence can be enhanced.

After calcination, the phosphor obtained is pulverized and thereafter treated according to various operations generally employed in preparation of phosphor such as washing, drying, screening with sieve, etc., to give the stimulable phosphor of the present invention containing oxygen.

The alkali halide phosphor of the present invention containing oxygen thus obtained is clearly smaller in afterglow of stimulated luminescence as compared with the alkali halide phosphor containing no oxygen known in the prior art.

In the alkali halide phosphor, afterglow tends to be reduced as the amount of oxygen contained therein is larger, but if the content of oxygen is too much, the intensity of stimulated luminescence will be lowered and therefore the radiographic sensitivity will be lowered undesirably when used for radiographic image storage panel. Accordingly, the optimum content of oxygen is selected practically depending on the combination of intensity of stimulated luminescence and afterglow characteristic of stimulated luminescence. For reducing afterglow of stimulated luminescence without substantial lowering in intensity of stimulated luminescence, the content as oxygen atoms and/or oxygen ions per 1 mole of the alkali halide may be preferably 0.5 mole or less, more preferably $10^{-6}$ mole to 0.2 mole.

When the above alkali halide contains Rb and/or Cs as the component, afterglow of stimulated luminescence is reduced remarkably by containing oxygen. Also, when at least one selected from the compounds of Tl, Na, Ag, Cu and In is used as the activator, afterglow of stimulated luminescence will be remarkably reduced by containing oxygen.

Also, in the case of obtaining a stimulable phosphor according to the gas phase deposition method such as the vapor deposition method or the sputtering method, the alkali halide phosphor characterized by containing oxygen is smaller in afterglow of stimulated luminescence as compared with the alkali halide phosphor containing no oxygen known in the prior art. The content of oxygen atoms and/or oxygen ions may be preferably 0.5 mole or less, more preferably $10^{-6}$ mole to 0.2 mole, per 1 mole of the alkali halide. Reduction in afterglow of stimulated luminescence by incorporation of oxygen is particularly marked, when Rb and/or Cs is contained as the component in the alkali halide, or at least one selected from Tl, Na, Ag, Cu and In is used as the activator.

Further, the alkali halide phosphor characterized by containing oxygen of the present invention is not only reduced in afterglow of stimulated luminescence, but also the afterglow of emission when excited with a radiation or UV-ray, etc., (momentary emission) will be also reduced corresponding to the extent of reduction in afterglow of stimulated luminescence. When a radiographic image storage panel containing the alkali halide phosphor characterized by containing oxygen of the present invention is used in the method of obtaining a radiographic image transmitted through a subject or emitted from the subject by use of a radiographic image storage panel containing stimulable phosphor, due to its small amount of afterglow of the momentary emission, it is also possible to shorten the time between emission of the radiation and initiation of excitation with a laser of visible ray or infrared ray, for example, about 1 sec. to 10 sec., whereby it becomes possible to enhance the running efficiency as the system.

The present invention is described below by referring to the following Examples and Comparative examples, but these Examples are not intended to limit the present invention.

EXAMPLES

This invention will be more fully illustrated by way of the following examples.

EXAMPLE 1

Each of stimulable phosphor raw materials was weighed as shown below with the items (1)–(53) and admixed well by means of a ball mil to prepare 53 kinds of mixtures of phosphor materials.

| | | | | |
|---|---|---|---|---|
| (1) | RbBr | 163.7 g | (0.99 | mole) |
| | CsF | 1.52 g | (0.01 | mole) |
| | TlBr | 0.284 g | (0.001 | mole) |
| (2) | CsBr | 210.7 g | (0.99 | mole) |
| | CsF | 1.52 g | (0.01 | mole) |
| | TlBr | 0.284 g | (0.001 | mole) |
| (3) | RbBr | 82.7 g | (0.5 | mole) |
| | CsBr | 106.4 g | (0.5 | mole) |
| | CsF | 1.52 g | (0.01 | mole) |
| | TlBr | 0.284 g | (0.001 | mole) |
| (4) | RbCl | 120.9 g | (1 | mole) |
| | CaF$_2$ | 7.81 g | (0.1 | mole) |
| | AlF$_3$ | 0.840 g | (0.01 | mole) |
| | Eu$_2$O$_3$ | 0.176 g | (0.0005 | mole) |
| (5) | RbBr | 165.4 g | (1 | mole) |
| | Eu$_2$O$_3$ | 0.176 g | (0.0005 | mole) |
| (6) | RbBr | 165.4 g | (1 | mole) |
| | Eu$_2$O$_3$ | 0.176 g | (0.0005 | mole) |
| | Tb$_4$O$_7$ | 0.0748 g | (0.0001 | mole) |
| (7) | RbBr | 165.4 g | (1 | mole) |
| | TlBr | 0.284 g | (0.001 | mole) |
| (8) | RbBr | 165.4 g | (1 | mole) |
| | TlBr | 0.284 g | (0.001 | mole) |
| | NaBr | 0.0206 g | (0.0002 | mole) |
| (9) | RbBr | 165.4 g | (1 | mole) |
| | BaF$_2$ | 17.54 g | (0.1 | mole) |
| | AlF$_3$ | 0.840 g | (0.01 | mole) |

-continued

| | | | | |
|---|---|---|---|---|
| | TlBr | 0.284 g | (0.001 | mole) |
| (10) | RbBr | 157.1 g | (0.95 | mole) |
| | CsF | 7.60 g | (0.05 | mole) |
| | BaF$_2$ | 17.54 g | (0.1 | mole) |
| | AlF$_3$ | 0.840 g | (0.01 | mole) |
| | Tl$_2$O | 0.212 g | (0.0005 | mole) |
| (11) | RbBr | 157.1 g | (0.95 | mole) |
| | LiI | 6.69 g | (0.05 | mole) |
| | BaF$_2$ | 17.54 g | (0.1 | mole) |
| | AlF$_3$ | 0.840 g | (0.01 | mole) |
| | Tl$_2$O$_3$ | 0.228 g | (0.0005 | mole) |
| (12) | RbI | 212.4 g | (1 | mole) |
| | MgF$_2$ | 62.31 g | (0.1 | mole) |
| | AlF$_3$ | 0.840 g | (0.01 | mole) |
| | Eu$_2$O$_3$ | 0.176 g | (0.0005 | mole) |
| (13) | CsF | 151.9 g | (1 | mole) |
| | BaF$_2$ | 17.54 g | (0.1 | mole) |
| | LaF$_2$ | 1.96 g | (0.01 | mole) |
| | EuF$_3$ | 0.209 g | (0.001 | mole) |
| (14) | CsBr | 212.8 g | (1 | mole) |
| | Eu$_2$O$_3$ | 0.176 g | (0.0005 | mole) |
| (15) | CsBr | 212.8 g | (1 | mole) |
| | Tl$_2$O | 0.212 g | (0.0005 | mole) |
| (16) | CsBr | 212.8 g | (1 | mole) |
| | BaF$_2$ | 17.54 g | (0.1 | mole) |
| | Tl$_2$O | 0.212 g | (0.0005 | mole) |
| (17) | CsBr | 212.8 g | (1 | mole) |
| | BaBr$_2$ | 29.71 g | (0.1 | mole) |
| | Tl$_2$O | 0.212 g | (0.0005 | mole) |
| (18) | CsBr | 212.8 g | (1 | mole) |
| | YCl$_3$ | 0.976 g | (0.005 | mole) |
| | Tl$_2$O | 0.212 g | (0.0005 | mole) |
| (19) | CsBr | 212.8 g | (1 | mole) |
| | YCl$_3$ | 19.53 g | (0.1 | mole) |
| | Tl$_2$O | 0.212 g | (0.0005 | mole) |
| (20) | CsBr | 212.8 g | (1 | mole) |
| | YCl$_3$ | 78.11 g | (0.4 | mole) |
| | Tl$_2$O | 0.212 g | (0.0005 | mole) |
| (21) | NaI | 149.9 g | (1 | mole) |
| | BaF$_2$ | 17.54 g | (0.1 | mole) |
| | YF$_3$ | 1.464 g | (0.01 | mole) |
| | Eu$_2$O$_3$ | 0.176 g | (0.0005 | mole) |
| (22) | KBr | 119.0 g | (1 | mole) |
| | BaF$_2$ | 17.54 g | (0.1 | mole) |
| | YF$_3$ | 1.46 g | (0.01 | mole) |
| | Eu$_2$O$_3$ | 0.176 g | (0.0005 | mole) |
| (23) | KI | 166.0 g | (1 | mole) |
| | BaF$_2$ | 17.54 g | (0.1 | mole) |
| | AlF$_3$ | 0.840 g | (0.01 | mole) |
| | Eu$_2$O$_3$ | 0.176 g | (0.0005 | mole) |
| (24) | RbBr | 165.4 g | (1 | mole) |
| | BaF$_2$ | 17.54 g | (0.1 | mole) |
| | BaBr$_2$.2H$_2$O | 33.31 g | (0.1 | mole) |
| | Eu$_2$O$_3$ | 0.176 g | (0.0005 | mole) |
| (25) | RbBr | 165.4 g | (1 | mole) |
| | BaF$_2$ | 17.54 g | (0.1 | mole) |
| | BaBr$_2$.2H$_2$O | 33.31 g | (0.1 | mole) |
| | Tl$_2$O | 0.212 g | (0.0005 | mole) |
| (26) | RbBr | 165.4 g | (1 | mole) |
| | BaF$_2$ | 26.31 g | (0.15 | mole) |
| | BaBr$_2$.2H$_2$O | 49.97 g | (0.15 | mole) |
| | Tl$_2$O | 0.424 g | (0.001 | mole) |
| (27) | RbBr | 165.4 g | (1 | mole) |
| | BaF$_2$ | 26.31 g | (0.15 | mole) |
| | BaCl$_2$ | 31.23 g | (0.15 | mole) |
| | NaF | 0.0084 g | (0.0002 | mole) |
| (28) | TbI | 212.4 g | (1 | mole) |
| | MgF$_2$ | 62.31 g | (0.1 | mole) |
| | AlF$_3$ | 0.840 g | (0.01 | mole) |
| | Eu$_2$O$_3$ | 0.176 g | (0.0005 | mole) |
| (29) | CsBr | 212.8 g | (1 | mole) |
| | BaF$_2$ | 17.54 g | (0.1 | mole) |
| | BaBr$_2$ | 29.71 g | (0.1 | mole) |
| | Tl$_2$O | 0.212 g | (0.0005 | mole) |
| (30) | CsBr | 212.8 g | (1 | mole) |
| | BaF$_2$ | 17.54 g | (0.1 | mole) |
| | BaCl$_2$ | 20.82 g | (0.1 | mole) |
| | Tl$_2$O | 0.212 g | (0.0005 | mole) |
| (31) | RbBr | 160.4 g | (0.97 | mole) |
| | CsF | 4.56 g | (0.03 | mole) |
| | TlBr | 0.0568 g | (0.0002 | mole) |
| (32) | RbBr | 160.4 g | (0.97 | mole) |

-continued

|  |  |  |  |
|---|---|---|---|
|  | CsF | 4.56 g | (0.03 mole) |
|  | TlBr | 0.568 g | (0.002 mole) |
| (33) | RbBr | 160.4 g | (0.97 mole) |
|  | CsF | 4.56 g | (0.03 mole) |
|  | TlBr | 5.68 g | (0.02 mole) |
| (34) | RbBr | 165.4 g | (1 mole) |
|  | BaF$_2$ | 17.54 g | (0.1 mole) |
|  | AlF$_3$ | 0.840 g | (0.01 mole) |
|  | TlBr | 0.568 g | (0.002 mole) |
| (35) | RbBr | 157.1 g | (0.95 mole) |
|  | CsF | 7.60 g | (0.05 mole) |
|  | BaF$_2$ | 17.54 g | (0.1 mole) |
|  | AlF$_3$ | 0.840 g | (0.01 mole) |
|  | Tl$_2$O | 0.424 g | (0.001 mole) |
| (36) | RbBr | 165.4 g | (1 mole) |
|  | BaF$_2$ | 17.54 g | (0.1 mole) |
|  | AlF$_3$ | 0.840 g | (0.01 mole) |
|  | TlBr | 0.568 g | (0.002 mole) |
|  | NaBr | 0.0412 g | (0.0004 mole) |
| (37) | RbI | 212.4 g | (1 mole) |
|  | MgF$_2$ | 6.23 g | (0.1 mole) |
|  | LaF$_3$ | 1.96 g | (0.01 mole) |
|  | AgI | 0.470 g | (0.002 mole) |
| (38) | CsF | 151.9 g | (1 mole) |
|  | TlF | 0.447 g | (0.002 mole) |
| (39) | CsBr | 212.8 g | (1 mole) |
|  | NaBr | 0.0206 g | (0.0002 mole) |
| (40) | CsBr | 212.8 g | (1 mole) |
|  | NaBr | 0.206 g | (0.002 mole) |
| (41) | CsBr | 212.8 g | (1 mole) |
|  | NaBr | 2.06 g | (0.02 mole) |
| (42) | CsBr | 212.8 g | (1 mole) |
|  | BaCl$_2$ | 20.82 g | (0.1 mole) |
|  | YF$_3$ | 1.46 g | (0.01 mole) |
|  | NaBr | 0.206 g | (0.002 mole) |
| (43) | CsBr | 202.2 g | (0.95 mole) |
|  | RbI | 10.62 g | (0.05 mole) |
|  | BaCl$_2$ | 20.82 g | (0.1 mole) |
|  | YF$_3$ | 1.46 g | (0.01 mole) |
|  | NaBr | 0.206 g | (0.002 mole) |
| (44) | CsBr | 208.5 g | (0.98 mole) |
|  | RbI | 4.25 g | (0.02 mole) |
|  | TlBr | 0.568 g | (0.002 mole) |
| (45) | RbBr | 165.4 g | (1 mole) |
|  | BaF$_2$ | 17.54 g | (0.1 mole) |
|  | AlF$_3$ | 0.840 g | (0.01 mole) |
|  | SiO$_2$ | 0.601 g | (0.01 mole) |
|  | TlBr | 0.568 g | (0.002 mole) |
| (46) | RbBr | 165.4 g | (1 mole) |
|  | BaF$_2$ | 17.54 g | (0.1 mole) |
|  | AlF$_3$ | 0.840 g | (0.01 mole) |
|  | SiO$_2$ | 3.004 g | (0.05 mole) |
|  | TlBr | 0.568 g | (0.002 mole) |
| (47) | RbBr | 165.4 g | (1 mole) |
|  | BaF$_2$ | 17.54 g | (0.1 mole) |
|  | AlF$_3$ | 0.840 g | (0.01 mole) |
|  | SiO$_2$ | 6.009 g | (0.1 mole) |
|  | TlBr | 0.568 g | (0.002 mole) |
| (48) | RbBr | 165.4 g | (1 mole) |
|  | BaF$_2$ | 17.54 g | (0.1 mole) |
|  | AlF$_3$ | 0.840 g | (0.01 mole) |
|  | SiO$_2$ | 24.03 g | (0.4 mole) |
|  | TlBr | 0.568 g | (0.002 mole) |
| (49) | CsBr | 212.8 g | (1 mole) |
|  | BaCl$_2$ | 20.82 g | (0.1 mole) |
|  | YF$_3$ | 1.46 g | (0.01 mole) |
|  | Al$_2$O$_3$ | 1.020 g | (0.01 mole) |
|  | NaBr | 0.206 g | (0.002 mole) |
| (50) | CsBr | 212.8 g | (1 mole) |
|  | BaCl$_2$ | 20.82 g | (0.1 mole) |
|  | YF$_3$ | 1.46 g | (0.01 mole) |
|  | Al$_2$O$_3$ | 5.098 g | (0.05 mole) |
|  | NaBr | 0.206 g | (0.002 mole) |
| (51) | CsBr | 212.8 g | (1 mole) |
|  | BaCl$_2$ | 20.82 g | (0.1 mole) |
|  | YF$_3$ | 1.46 g | (0.01 mole) |
|  | Al$_2$O$_3$ | 10.20 g | (0.1 mole) |
|  | NaBr | 0.206 g | (0.002 mole) |
| (52) | CsBr | 212.8 g | (1 mole) |
|  | BaCl$_2$ | 20.82 g | (0.1 mole) |
|  | YF$_3$ | 1.46 g | (0.01 mole) |
|  | Al$_2$O$_3$ | 40.78 g | (0.4 mole) |

-continued

|  |  |  |  |
|---|---|---|---|
|  | NaBr | 0.206 g | (0.002 mole) |
| (53) | RbI | 212.4 g | (1 mole) |
|  | MgF$_2$ | 62.31 g | (0.1 mole) |
|  | AlF$_3$ | 0.840 g | (0.01 mole) |
|  | MgO | 2.016 g | (0.05 mole) |
|  | EuI$_3$ | 0.533 g | (0.001 mole) |

Then, the above 53 kinds of the stimulable phosphor mixtures were packed into a quartz boat and baked in an electric furnace, respectively. Baking was carried out at 650° C. for 2 hours under stream of nitrogen gas at a flow rate of 2500 cc/min and then the baked product was allowed to cool up to room temperature.

The resulting baked product was finely grinded by means of a ball mill and passed through a sieve with 150 mesh for regulating a particle diameter, thereby yielding the respective stimulable phosphors.

Then, radiation energy storage panels of the present invention were prepared by using said 53 kinds of the stimulable phosphors. Each of the radiation energy storage panel was prepared as follows.

First, 8 parts by weight of a stimulable phosphor were dispersed in 1 part by weight of polyvinyl butyral (a binder) by using a solvent composed of a mixture of equal volumes of acetone and ethyl acetate, and the resulting dispersion was uniformly coated over a polyethylene telephthalate film (a support) kept horizontally by using a wire bar and allowed to natural seasoning, thereby forming a radiation energy storage panel of the present invention having film thickness of about 300 μm.

These 53 kinds of the radiation energy storage panels of the present invention were each irradiated with X-ray having a tube voltage of 80 KVp and a tube current of 100 mA for 0.1 second at a distance of 100 cm from the focus of an X-ray tube and then excited with a semi-conductor laser of 780 nm and 10 mW. Fluorescence emitted by stimulation from the stimulable phosphor-containing layer was measured by means of a photodetector. The results are summarized in Table 1.

COMPARATIVE EXAMPLE 1

Following the same procedures as in Example 1 except that 175.4 g (1 mole) of BaF$_2$, 333.3 g (1 mole) of BaBr$_2$.2H$_2$O and 0.352 g (0.001 mole) of Eu$_2$O$_3$ were used as a raw material for stimulable phosphor, there was obtained a stimulable phosphor BaFBr:0.001Eu. A comparative radiation energy storage panel was prepared from the stimulable phosphor in the same manner as in Example 1 and a stimulable emission luminance was measured by using a semi-conductor laser (780 nm, 10 mW). The results are also shown in Table 1.

COMPARATIVE EXAMPLE 2

Following the same procedures as in Comparative Example 1 except that an He-Ne laser (633 nm, 10 mW) was applied instead of the semi-conductor laser, one measured stimulable emission luminance. The results are also shown in Table 1.

REFERENCE EXAMPLE 1

Following the exactly same procedures as in Example 1 except that the metal oxide components SiO$_2$, Al$_2$O$_3$, MgO and TiO$_2$ were omitted in turn from the raw materials of stimulable phosphor samples of Example 1 (44), (48), (52) and (53), respectively, there were prepared the following reference samples (1), (2), (3)

and (4) corresponding to the samples (1), (5), (9) and (10), the stimulable emission luminance of which was measured by means of a semi-conductor laser (780 nm, 10 mW). The results are also shown in Table 1.

Reference sample (1): RbBr 0.1BaF$_2$.0.01AlF$_3$:0.002Tl

Reference sample (2): CsBr.0.1BaCl$_2$0.01YF$_3$:0.002Na

Reference sample (3): RbI.0.1MgF$_2$.0.01AlF$_3$:0.001Eu

TABLE 1

| | Composition of phosphor | Exciting wave length | Relative emission strength by stimulation |
|---|---|---|---|
| Comparative example 1 | BaFBr:Eu | 780 nm | 1 |
| Comparative example 2 | BaFBr:Eu | 633 nm | 38 |
| Example 1 (1) | 0.99RbBr.0.01CsF.0.001Tl | 780 nm | 300 |
| Example 1 (2) | 0.99CsBr.0.01CsF.0.001Tl | 780 nm | 120 |
| Example 1 (3) | 0.5RbBr.0.5CsBr.0.01CsF:0.001Tl | 780 nm | 250 |
| Example 1 (4) | RbCl.0.1CaF$_2$.0.01AlF$_3$:0.001Eu | 780 nm | 62 |
| Example 1 (5) | RbBr:0.001Eu | 780 nm | 80 |
| Example 1 (6) | RbBr:0.001Eu.0.0004Tb | 780 nm | 88 |
| Example 1 (7) | RbBr 0.001Tl | 780 nm | 96 |
| Example 1 (8) | RbBr:0.001Tl.0.0002Na | 780 nm | 102 |
| Example 1 (9) | RbBr:0.1BaF$_2$.0.01AlF$_3$:0.001Tl | 780 nm | 110 |
| Example 1 (10) | 0.95RbBr.0.05CsF.0.1BaF$_2$.0.01AlF$_3$:0.001Tl | 780 nm | 205 |
| Example 1 (11) | 0.95RbBr.0.5LiI.0.1BaF$_2$.0.01AlF$_3$:0.001Tl | 780 nm | 180 |
| Example 1 (12) | RbI.0.1MgF$_2$.0 01AlF$_3$:0.001Eu | 780 nm | 72 |
| Example 1 (13) | CsF.0.1BaF$_2$.0.01LaF$_3$:0.001Eu | 780 nm | 60 |
| Example 1 (14) | CsBr:0.001Eu | 780 nm | 72 |
| Example 1 (15) | CsBr:0.001Tl | 780 nm | 88 |
| Example 1 (16) | CsBr:0.1BaBr$_2$:0.001Tl | 780 nm | 98 |
| Example 1 (17) | CsBr:0.4BaBr$_2$:0.001Tl | 780 nm | 90 |
| Example 1 (18) | CsBr:0.005YCl$_3$:0.001Tl | 780 nm | 112 |
| Example 1 (19) | CsBr:0.1YCl$_3$:0.001Tl | 780 nm | 96 |
| Example 1 (20) | CsBr:0.4YCl$_3$:0.001Tl | 780 nm | 90 |
| Example 1 (21) | NaI.0.1BaF$_2$.0.01YF$_3$:0.001Eu | 780 nm | 56 |
| Example 1 (22) | KBr.0.1BaF$_2$.0.01YF$_3$:0.001Eu | 780 nm | 50 |
| Example 1 (23) | KI.0.1BaF$_2$.0.01AlF$_3$:0.001Eu | 780 nm | 58 |
| Example 1 (24) | RbBr.0.2BaFBr:0.001Eu | 780 nm | 82 |
| Example 1 (25) | RbBr.0.2BaFBr:0.001Tl | 780 nm | 92 |
| Example 1 (26) | RbBr.0.3BaFBr:0.002Tl | 780 nm | 90 |
| Example 1 (27) | RbBr.0.3BaFCl:0.0002Na | 780 nm | 66 |
| Example 1 (28) | RbI.0.1MgF$_2$.0.01AlF$_3$:0.001Eu | 780 nm | 72 |
| Example 1 (29) | CsBr.0.2BaFBr:0.001Tl | 780 nm | 100 |
| Example 1 (30) | CsBr.0.2BaFCl:0.001Tl | 780 nm | 94 |
| Example 1 (31) | 0.97RbBr.0.03CsF:0.0002Tl | 780 nm | 124 |
| Example 1 (32) | 0.97RbBr.0.03CsF:0.002Tl | 780 nm | 196 |
| Example 1 (33) | 0.97RbBr.0.03CsF:0.02Tl | 780 nm | 118 |
| Example 1 (34) | RbBr.0.1BaF$_2$.0.01AlF$_3$:0.002Tl | 780 nm | 116 |
| Example 1 (35) | 0.95RbBr.0.05CsF.0.1BaF$_2$.0.01AlF$_3$:0.002Tl | 780 nm | 205 |
| Example 1 (36) | RbBr.0.1BaF$_3$.0.01AlF$_3$:0.002Tl.0.0004Na | 780 nm | 133 |
| Example 1 (37) | RbI.0.1MgF$_2$.0.01LaF$_3$:0.002Ag | 780 nm | 53 |
| Example 1 (38) | CsF:0.002Tl | 780 nm | 75 |
| Example 1 (39) | CsBr:0.0002Na | 780 nm | 55 |
| Example 1 (40) | CsBr:0.002Na | 780 nm | 82 |
| Example 1 (41) | CsBr:0.02Na | 780 nm | 61 |
| Example 1 (42) | CsBr:0.1BaCl$_2$.0.01YF$_3$:0.002Na | 780 nm | 90 |
| Example 1 (43) | 0.95CsBr.0.05RbI.0.1BaCl$_2$.0.01YF$_3$:0.002Na | 780 nm | 157 |
| Example 1 (44) | 0.98CsBr.0.02RbI:0.002Tl | 780 nm | 180 |
| Reference | RbBr 0.1BaF$_2$.0.01AlF$_3$: | 780 nm | 104 |

TABLE 1-continued

| | Composition of phosphor | Exciting wave length | Relative emission strength by stimulation |
|---|---|---|---|
| Example (1) | 0.002Tl | | |
| Example 1 (45) | RbBr.0.1BaF$_2$.0.01AlF$_3$:0.01SiO$_2$:0.002Tl | 780 nm | 152 |
| Example 1 (46) | RbBr.0.1BaF$_2$.0.01AlF$_3$:0.05SiO$_2$:0.002Tl | 780 nm | 145 |
| Example 1 (47) | RbBr.0.1BaF$_2$.0.01AlF$_3$:0.1SiO$_2$:0.02Tl | 780 nm | 121 |
| Example 1 (48) | RbBr.0.1BaF$_2$.0.01AlF$_3$:0.4SiO$_2$:0.002Tl | 780 nm | 107 |
| Reference Example (2) | CsBr:0.1BaCl$_2$.0.01YF$_3$:0.002Na | 780 nm | 88 |
| Example 1 (49) | CsBr:0.1BaCl$_2$.0.01YF$_3$.0.01Al$_2$O$_3$:0.002Na | 780 nm | 131 |
| Example 1 (50) | CsBr:0.1BaCl$_2$.0.01YF$_3$.0.05Al$_2$O$_3$:0.002Na | 780 nm | 123 |
| Example 1 (51) | CsBr:0.1BaCl$_2$.0.01YF$_3$.0.1Al$_2$O$_3$:0.002Na | 780 nm | 101 |
| Example 1 (52) | CsBr:0.1BaCl$_2$.0.01YF$_3$.0.4Al$_2$O$_3$:0.002Na | 780 nm | 94 |
| Reference Example (3) | RbI.0.1MgF$_2$.0.01AlF$_3$:0.001Eu | 780 nm | 73 |
| Example 1 (53) | RbI.0.1MgF$_2$.0.01AlF$_3$.0.05MgO:0.001Eu | 780 nm | 96 |

As apparent from the above Table 1, the present radiation energy storage panel as prepared from stimulable phosphors of the above samples (1) to (53) showed a higher emission luminance by stimulation than the one of comparative radiation energy storage panel as measured under the same conditions, said comparative panel being prepared from the prior art stimulable phosphor BaFBr:Eu as shown in the above Comparative Example 1 and hence the method for converting radiographic image of this invention using the present radiation energy storage panel showed a higher sensitivity than the prior art method for converting radiographic image did using the comparative radiation energy storage panel.

Then, the prior stimulable phosphor BaFBr Eu as seen in Comparative Example 1 showed a peak wave length at approximately 600 nm in the stimulable excited spectrum and it is said that He-Ne laser light (633 nm) was particularly preferable as an exciting light source [see Japanese Provisional Patent Publication No. 15025/1980 and others]. Accordingly, the comparative radiation energy storage panel prepared from BaFBr:Eu was measured for the said stimulable emission luminance under the same conditions as used in the above-mentioned method except that an He-Ne laser (633 nm) was used instead of the semi-conductor laser (780 nm). The results in terms of Comparative Example 2 were shown in the above Table 1, which revealed that the comparative radiation energy storage panel showed a lower stimulable emission luminance than these by all present radiation energy storage panels. Therefore, the present method for converting radiographic image using the present radiation energy storage panel can utilize as an exciting light source a semi-conductor laser so that the present method may be effected in a more miniaturized state with a higher sensitivity, as compared with the prior method for converting radiographic image using the He-Ne laser.

EXAMPLE 2

Each phosphor raw material was weighed as shown in the following items (54) to (85) and admixed well by means of a ball mill to prepare 35 kinds of mixtures of phosphor raw materials.

| | | | |
|---|---|---|---|
| (54) | CsBr | 202.2 g | (0.95 mole) |
| | CsI | 12.99 g | (0.05 mole) |
| | TlBr | 0.568 g | (0.002 mole) |
| (55) | CsBr | 202.2 g | (0.95 mole) |
| | CsI | 12.99 g | (0.05 mole) |
| | TlBr | 0.568 g | (0.002 mole) |
| | NaBr | 0.0412 g | (0.0004 mole) |
| (56) | CsBr | 202.2 g | (0.95 mole) |
| | CsI | 12.99 g | (0.05 mole) |
| | TlBr | 0.568 g | (0.002 mole) |
| | AgBr | 0.0751 g | (0.0004 mole) |
| (57) | CsBr | 202.2 g | (0.95 mole) |
| | CsI | 12.99 g | (0.05 mole) |
| | TlBr | 0.568 g | (0.002 mole) |
| | $Eu_2O_3$ | 0.0704 g | (0.0002 mole) |
| (58) | CsBr | 206.4 g | (0.97 mole) |
| | RbI | 6.372 g | (0.03 mole) |
| | TlBr | 0.568 g | (0.002 mole) |
| (59) | CsBr | 191.5 g | (0.9 mole) |
| | RbI | 21.24 g | (0.1 mole) |
| | TlBr | 0.568 g | (0.002 mole) |
| (60) | CsBr | 106.4 g | (0.5 mole) |
| | RbI | 106.2 g | (0.5 mole) |
| | TlBr | 0.568 g | (0.002 mole) |
| (61) | CsBr | 191.5 g | (0.9 mole) |
| | RbI | 21.24 g | (0.1 mole) |
| | $BaF_2$ | 17.54 g | (0.1 mole) |
| | $YF_3$ | 1.46 g | (0.01 mole) |
| | TlBr | 0.568 g | (0.002 mole) |
| (62) | CsBr | 191.5 g | (0.9 mole) |
| | RbI | 21.24 g | (0.1 mole) |
| | $BaF_2$ | 17.54 g | (0.1 mole) |
| | $LaF_3$ | 1.96 g | (0.01 mole) |
| | $Tl_2O$ | 0.424 g | (0.001 mole) |
| (63) | CsBr | 191.5 g | (0.9 mole) |
| | NaI | 14.99 g | (0.1 mole) |
| | TlBr | 0.568 g | (0.002 mole) |
| (64) | CsBr | 191.5 g | (0.9 mole) |
| | NaI | 14.99 g | (0.1 mole) |
| | $BaCl_2$ | 20.82 g | (0.1 mole) |
| | $AlF_3$ | 0.840 g | (0.01 mole) |
| | TlBr | 0.568 g | (0.002 mole) |
| (65) | CsBr | 191.5 g | (0.9 mole) |
| | KBr | 11.90 g | (0.1 mole) |
| | $Tl_2O$ | 0.424 g | (0.001 mole) |
| (66) | CsBr | 191.5 g | (0.9 mole) |
| | NaCl | 5.84 g | (0.1 mole) |
| | $Tl_2O$ | 0.424 g | (0.001 mole) |
| (67) | CsBr | 191.5 g | (0.9 mole) |
| | LiF | 2.59 g | (0.1 mole) |
| | $Tl_2O$ | 0.424 g | (0.001 mole) |
| (68) | CsCl | 151.5 g | (0.9 mole) |
| | LiF | 2.59 g | (0.1 mole) |
| | $Tl_2O$ | 0.424 g | (0.001 mole) |
| (69) | RbBr | 165.4 g | (1 mole) |
| | TlBr | 0.568 g | (0.002 mole) |
| (70) | RbBr | 165.4 g | (1 mole) |
| | TlBr | 0.568 g | (0.002 mole) |
| | NaBr | 0.0412 g | (0.0004 mole) |
| (71) | RbBr | 165.4 g | (1 mole) |
| | TlBr | 0.568 g | (0.002 mole) |
| | AgBr | 0.0751 g | (0.0004 mole) |
| (72) | RbBr | 165.4 g | (1 mole) |
| | TlBr | 0.568 g | (0.002 mole) |
| | $Eu_2O_3$ | 0.0704 g | (0.0002 mole) |
| (73) | RbBr | 160.4 g | (0.97 mole) |
| | CsF | 4.56 g | (0.03 mole) |
| | TlBr | 0.568 g | (0.002 mole) |
| (74) | RbBr | 148.9 g | (0.9 mole) |
| | CsF | 15.19 g | (0.1 mole) |
| | TlBr | 0.568 g | (0.002 mole) |
| (75) | RbBr | 115.8 g | (0.7 mole) |
| | CsF | 45.57 g | (0.3 mole) |
| | TlBr | 0.568 g | (0.002 mole) |
| (76) | RbBr | 148.9 g | (0.9 mole) |
| | CsF | 15.19 g | (0.1 mole) |
| | $BaF_2$ | 17.54 g | (0.1 mole) |
| | $AlF_3$ | 0.840 g | (0.01 mole) |
| | TlBr | 0.568 g | (0.002 mole) |
| (77) | RbBr | 148.9 g | (0.9 mole) |
| | CsF | 15.19 g | (0.1 mole) |
| | $BaCl_2$ | 20.82 g | (0.1 mole) |
| | $YF_3$ | 1.46 g | (0.01 mole) |
| | $Tl_2O$ | 0.424 g | (0.001 mole) |
| (78) | RbBr | 148.9 g | (0.9 mole) |
| | CsI | 25.98 g | (0.1 mole) |
| | TlBr | 0.568 g | (0.002 mole) |
| (79) | RbBr | 148.9 g | (0.9 mole) |
| | RbI | 21.24 g | (0.1 mole) |
| | $Tl_2O$ | 0.424 g | (0.001 mole) |
| (80) | RbBr | 148.9 g | (0.9 mole) |
| | RbI | 21.24 g | (0.1 mole) |
| | $BaF_2$ | 17.54 g | (0.1 mole) |
| | $LaF_3$ | 1.96 g | (0.01 mole) |
| | TlBr | 0.568 g | (0.002 mole) |
| (81) | RbBr | 148.9 g | (0.9 mole) |
| | KBr | 11.90 g | (0.1 mole) |
| | $Tl_2O$ | 0.424 g | (0.001 mole) |
| (82) | RbBr | 148.9 g | (0.9 mole) |
| | NaCl | 5.84 g | (0.1 mole) |
| | $Tl_2O$ | 0.424 g | (0.001 mole) |
| (83) | RbBr | 148.9 g | (0.9 mole) |
| | LiF | 2.59 g | (0.1 mole) |
| | $Tl_2O$ | 0.424 g | (0.001 mole) |
| (84) | RbF | 85.02 g | (0.9 mole) |
| | CsBr | 21.28 g | (0.1 mole) |
| | $Tl_2O$ | 0.424 g | (0.001 mole) |
| (85) | RbCl | 108.8 g | (0.9 mole) |
| | LiF | 2.59 g | (0.1 mole) |
| | $Tl_2O$ | 0.424 g | (0.001 mole) |

Then, the above 32 kinds of mixtures of phosphor raw materials were packed in a quartz boat and baked in an electric furnace. Baking was carried out at 650° C. for 2 hours under nitrogen gas stream at a flow rate of 2500 cc/min and then the baked product was allowed to cool up to room temperature.

The resulting baked product was finely grinded by means of a ball mill and passed through a sieve with 150 mesh for arranging particle size to give the phosphor samples (54) to (85).

The phosphor samples (54) to (85) were packed into a measurement holder, respectively, and each holder was irradiated with X-ray having a tube voltage of 80 KVp and a tube current of 100 mA for 0.1 second at as distance of 100 cm from the focus of the X-ray tube and then excited with an He-Ne laser light of 10 mW (633 nm, 10 nm) and fluorescence emitted by stimulation from the phosphor was measured by means of a photodetector. The results are shown in Table 2.

COMPARATIVE EXAMPLE 3

Following the same procedures as in Example 2 except that 74.56 g (1 mole) of KCl and 0.424 g (0.001 mole) of $Tl_2O$ were used as a phosphor raw material, there was obtained a phosphor KCl:0.002Tl. In the same manner as in Example 2, a comparative sample (3) was prepared from said phosphor material and a stimulable emission luminance was measured by means of an He-Ne laser (633 nm, 10 mW). The results are also shown in Table 2.

TABLE 2

| | Composition of phosphor | Emission luminance by stimulation $\lambda$ ex = 633 nm |
|---|---|---|
| Comparative sample (3) | KCl:0.002Tl | 1 |
| Sample (54) | 0.95CsBr.0.05CsI:0.002Tl | 122 |
| Sample (55) | 0.95CsBr.0.05CsI:0.002Tl. 0.0004Na | 146 |

TABLE 2-continued

| | Composition of phosphor | Emission luminance by stimulation $\lambda$ ex = 633 nm |
|---|---|---|
| Sample (56) | 0.95CsBr.0.05CsI:0.002Tl.0.0004Ag | 137 |
| Sample (57) | 0.95CsBr.0.05CsI:0.002Tl.0.0004Eu | 141 |
| Sample (58) | 0.97CsBr.0.03RbI:0.002Tl | 153 |
| Sample (59) | 0.9CsBr.0.1RbI:0.002Tl | 102 |
| Sample (60) | 0.7CsBr.0.3RbI:0.002Tl | 78 |
| Sample (61) | 0.9CsBr.0.1RbI.0.1BaF$_2$.0.01YF$_3$:0.002Tl | 118 |
| Sample (62) | 0.9CsBr.0.1RbI.0.1BaF$_2$.0.01LaF$_3$:0.002Tl | 113 |
| Sample (63) | 0.9CsBr.0.1NaI:0.002Tl | 86 |
| Sample (64) | 0.9CsBr.0.1NaI.0.1BaCl$_2$.0.01AlF$_3$:0.002Tl | 92 |
| Sample (65) | 0.9CsBr.0.1KBr:0.002Tl | 72 |
| Sample (66) | 0.9CsBr.0.1NaCl:0.002Tl | 68 |
| Sample (67) | 0.9CsBr.0.1LiF:0.002Tl | 73 |
| Sample (68) | 0.9CsCl.0.1LiF:0.002Tl | 59 |
| Sample (69) | RbBr:0.002Tl | 80 |
| Sample (70) | RbBr:0.002Tl.0.0004Na | 91 |
| Sample (71) | RbBr:0.002Tl.0.0004Ag | 88 |
| Sample (72) | RbBr:0.002Tl.0.0004Eu | 96 |
| Sample (73) | 0.97RbBr.0.03CsF:0.002Tl | 205 |
| Sample (74) | 0.9RbBr.0.1CsF:0.002Tl | 176 |
| Sample (75) | 0.7RbBr.0.3CsF:0.002Tl | 124 |
| Sample (76) | 0.9RbBr.0.1CsF.0.1BaF$_2$.0.01AlF$_3$:0.002Tl | 188 |
| Sample (77) | 0.9RbBr.0.1CsF.0.1BaCl$_2$.0.01YF$_3$:0.002Tl | 185 |
| Sample (78) | 0.9RbBr.0.1CsI:0.002Tl | 147 |
| Sample (79) | 0.9RbBr.0.1RbI:0.002Tl | 142 |
| Sample (80) | 0.9RbBr.0.1RbI.0.1BaF$_2$.0.01LaF$_3$:0.002Tl | 150 |
| Sample (81) | 0.9RbBr.0.1KBr:0.002Tl | 115 |
| Sample (82) | 0.9RbBr.0.1NaCl:0.002Tl | 108 |
| Sample (83) | 0.9RbBr.0.1LiF:0.002Tl | 121 |
| Sample (84) | 0.9RbF.0.1CsBr:0.001Tl | 80 |
| Sample (85) | 0.9RbCl.0.1LiF:0.001Tl | 75 |

As apparent from Table 2, an emission luminance by stimulation of the above phosphor samples (54) to (85) showed a higher value, as compared with the value measured under the same conditions for the comparative sample (3) composed of the prior phosphor KCl:0.002Tl as shown in Comparative Example 3.

EXAMPLE 3

The present radiation energy storage panel using the stimulable phosphors (10) and (35) as prepared by Example 1 was irradiated with an X-ray and then with an He-Ne laser for 10 μsec as an exciting light with a rectangularly variable strength. Change in luminance of the stimulable emission from the stimulable phosphor-containing layer was measured by means of a photodetector. Times required for luminance changing from 10 % to up to 90 % in stimulable emission were determined as response speed for exciting light of the stimulable phosphor and the results are shown in Table 3.

COMPARATIVE EXAMPLE 4

Following the same procedures as in Example 3 except that the comparative radiation energy storage panel prepared in Comparative Example 1 was applied instead of the present radiation energy storage panel (10), there was determined response speed. The results are shown in Table 3

TABLE 3

| | Composition of phosphor | Response speed (μsec) |
|---|---|---|
| Sample (10) | 0.95RbBr.0.05CsF.0.1BaF$_2$.0.01AlF$_3$:0.001Tl | 0.7 |
| Sample (35) | 0.95RbBr.0.05CsF.0.1BaF$_2$.0.01AlF$_3$:0.002Tl | 0.7 |
| Comparative Example 4 | BaFBr:Eu | 2.0 |

As apparent from Table 3, the present stimulable phosphor showed an approximately 3 times higher response speed, as compared with the comparative stimulable phosphor and the present method for converting radiographic image using the present stimulable phosphor can provide a reading speed of a radiation image as high as 3 times, as compared with the method using the prior stimulable phosphor.

EXAMPLE 4

The present radiation energy storage panel employed in Example 3 was irradiated with an X-ray in the same manner as in Example 1 and then accumulated energy was eliminated with a halogen lump having 10,000 luxes over 10 seconds. Then, the panel was excited with an He-Ne laser (10 mW) and a stimulable emission luminance from the stimulable phosphor-containing layer was measured by means of a photodetector. the measured results are shown in Table 4 in terms of the emission luminance before elimination with halogen lump as defined 1.

COMPARATIVE EXAMPLE 5

Following the same procedures as in Example 4 except that the comparative radiation energy storage panel prepared by Comparative Example 1 was used instead of the radiation energy storage panel, there was measured stimulable emission luminance. The results as measured are shown in Table 4 wherein the emission luminance before elimination with a halogen lump is defined as 1 in the same manner as in Example 4.

TABLE 4

| | Composition of phosphor | Emission luminance |
|---|---|---|
| Sample (10) | 0.95RbBr.0.05CsF.0.1BaF$_2$.0.01AlF$_3$:0.001Tl | $5.1 \times 10^{-3}$ |
| Sample (35) | 0.95RbBr.0.05CsF.0.1BaF$_2$.0.01AlF$_3$:0.002Tl | $5.1 \times 10^{-3}$ |
| Comparative Example 5 | BaFBr:Eu | $2.0 \times 10^{-2}$ |

As apparent from Table 4, the present stimulable phosphor can show an approximately 4 times higher elimination speed of the accumulated energy (residual image) in comparison with that of the prior stimulable phosphor. Thus, the present method for converting radiographic image using the present stimulable phosphor can reduce a time for eliminating after image to ¼, as compared with the comparative stimulable phosphor.

EXAMPLE 5

The radiation energy storage panels using the present stimulable phosphor, the sample (47) prepared in Example 1 and using the stimulable phosphor prepared in Comparative Example 1 were placed in a humid room set at 50° C. and a relative humidity of 90 % for a forced humidity test. This forced deterioration rate is at least 80 times, as compared with that seen generally in an airconditioned X-ray chamber at 20° C. and a relative humidity of 50 %. Respective radiation energy storage panels were periodically taken out, irradiated with X-ray in the same manner as in Example 1, excited with a semi-conductor laser and then emission luminance by stimulation was measured at that time. An emission luminance by stimulation in the respective radiation energy storage panels is defined as 100 prior to the forced humidity test and represented in terms of a relative luminance thereto. Comparison of lowered emission luminances by stimulation with lapse of time was made and the results are shown in FIG. 10.

Figure 10:
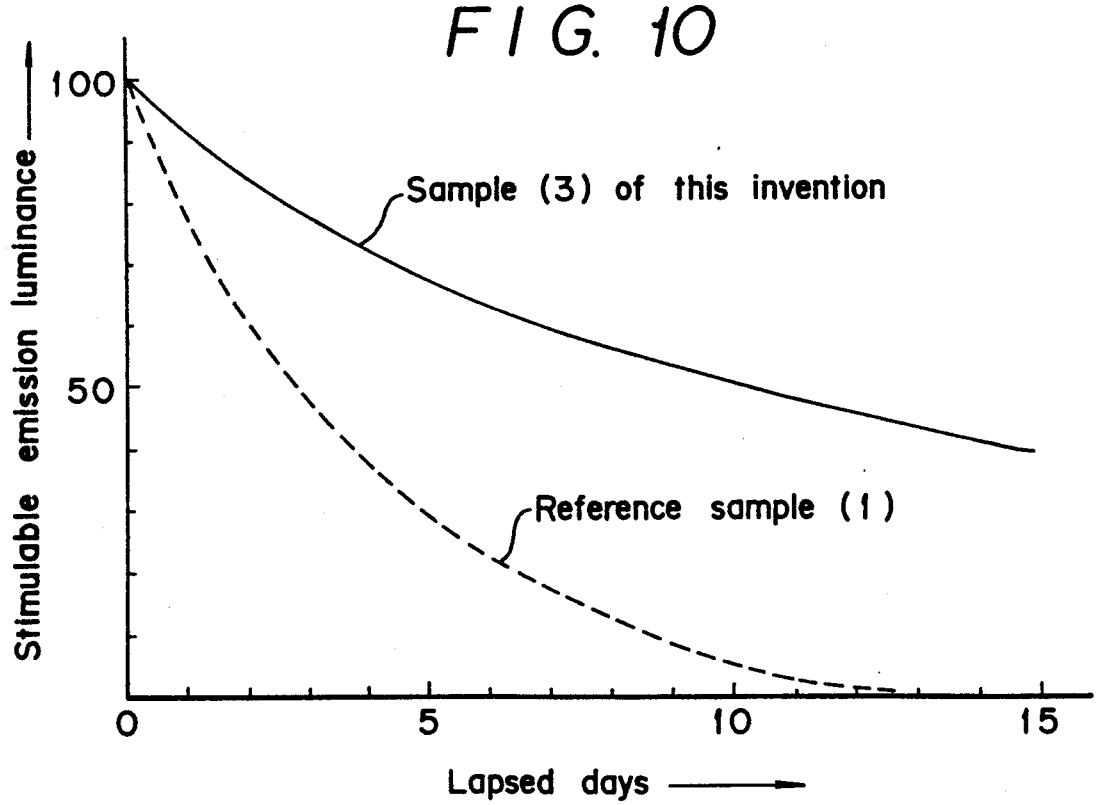
FIG. 10 shows a diagram showing the results from a forced humidity test.

As apparent from FIG. 10, the radiation energy storage panel using the present stimulable phosphor is superior in water vapor resistance to the panel using the comparative stimulable phosphor and can greatly improve lowering in stimulable emission luminance with lapse of time.

EXAMPLE 6

The respective stimulable phosphor starting materials were weighed as shown below by (86) to (117), and then thoroughly mixed by use of a ball mill to compound 32 kinds of stimulable phosphor starting material mixtures

| | | | |
|---|---|---|---|
| (86) | RbBr | 165.4 g | (1 mole) |
| | RbOH | 3.07 g | (0.03 mole) |
| | TlBr | 0.284 g | (0.001 mole) |
| (87) | RbBr | 165.4 g | (1 mole) |
| | NaOH | 2.00 g | (0.05 mole) |
| | TlBr | 0.284 g | (0.001 mole) |
| (88) | RbBr | 165.4 g | (1 mole) |
| | $Na_2CO_3$ | 3.18 g | (0.03 mole) |
| | TlBr | 0.284 g | (0.001 mole) |
| (89) | RbBr | 165.4 g | (1 mole) |
| | KOH | 2.81 g | (0.05 mole) |
| | TlBr | 0.284 g | (0.001 mole) |
| (90) | RbBr | 165.4 g | (1 mole) |
| | $Rb_2O$ | 3.74 g | (0.02 mole) |
| | TlBr | 0.284 g | (0.001 mole) |
| (91) | RbBr | 165.4 g | (1 mole) |
| | $Rb_2CO_3$ | 4.62 g | (0.02 mole) |
| | TlBr | 0.284 g | (0.001 mole) |
| (92) | RbBr | 1,654 g | (10 mole) |
| | $RbNO_3$ | 0.0044 g | ($3 \times 10^{-6}$ mole) |
| | TlBr | 2.84 g | (0.01 mole) |
| (93) | RbBr | 1,654 g | (10 mole) |
| | $RbNO_3$ | 0.0059 g | ($4 \times 10^{-6}$ mole) |
| | TlBr | 2.84 g | (0.01 mole) |
| (94) | RbBr | 1,654 g | (10 mole) |
| | $RbNO_3$ | 0.0147 g | ($1 \times 10^{-5}$ mole) |
| | TlBr | 2.84 g | (0.01 mole) |
| (95) | RbBr | 165.4 g | (1 mole) |
| | $RbNO_3$ | 0.0147 g | ($1 \times 10^{-5}$ mole) |
| | TlBr | 0.284 g | (0.001 mole) |
| (96) | RbBr | 165.4 g | (1 mole) |
| | $RbNO_3$ | 2.95 g | (0.02 mole) |
| | TlBr | 0.284 g | (0.001 mole) |
| (97) | RbBr | 165.4 g | (1 mole) |
| | $RbNO_3$ | 5.90 g | (0.04 mole) |
| | TlBr | 0.284 g | (0.001 mole) |
| (98) | RbBr | 165.4 g | (1 mole) |
| | $RbNO_3$ | 8.85 g | (0.06 mole) |
| | TlBr | 0.284 g | (0.001 mole) |
| (99) | RbBr | 165.4 g | (1 mole) |
| | $RbNO_3$ | 10.32 g | (0.07 mole) |
| | TlBr | 0.284 g | (0.001 mole) |
| (100) | RbBr | 165.4 g | (1 mole) |
| | $RbNO_3$ | 22.12 g | (0.15 mole) |
| | TlBr | 0.284 g | (0.001 mole) |
| (101) | RbBr | 165.4 g | (1 mole) |
| | $RbNO_3$ | 29.49 g | (0.2 mole) |
| | TlBr | 0.284 g | (0.001 mole) |
| (102) | RbBr | 165.4 g | (1 mole) |
| | $RbNO_3$ | 44.24 g | (0.3 mole) |
| | TlBr | 0.284 g | (0.001 mole) |
| (103) | RbBr | 165.4 g | (1 mole) |
| | $Rb_2SO_4$ | 5.34 g | (0.02 mole) |
| | TlBr | 0.284 g | (0.001 mole) |
| (104) | RbBr | 165.4 g | (1 mole) |
| | CsOH | 3.00 g | (0.02 mole) |
| | TlBr | 0.284 g | (0.001 mole) |
| (105) | RbBr | 165.4 g | (1 mole) |
| | $Cs_2CO_3$ | 3.26 g | (0.01 mole) |
| | TlBr | 0.284 g | (0.001 mole) |
| (106) | RbBr | 165.4 g | (1 mole) |
| | $TlNO_3$ | 0.107 g | (0.0004 mole) |
| (107) | RbBr | 165.4 g | (1 mole) |
| | RbOH | 3.07 g | (0.03 mole) |
| | $TlNO_3$ | 0.107 g | (0.0004 mole) |
| (108) | RbBr | 165.4 g | (1 mole) |
| | $Tl_2O$ | 0.204 g | (0.0005 mole) |
| (109) | RbBr | 165.4 g | (1 mole) |
| | $Rb_2CO_3$ | 4.62 g | (0.02 mole) |
| | $Tl_2O$ | 0.204 g | (0.0005 mole) |
| (110) | RbBr | 165.4 g | (1 mole) |
| | $SrCO_3$ | 2.95 g | (0.02 mole) |
| | TlBr | 0.284 g | (0.001 mole) |
| (111) | RbBr | 165.4 g | (1 mole) |
| | $BaCO_3$ | 3.95 g | (0.02 mole) |
| | TlBr | 0.284 g | (0.001 mole) |
| (112) | RbI | 212.4 g | (1 mole) |
| | $TlNO_3$ | 0.107 g | (0.0004 mole) |
| (113) | KI | 166.01 g | (1 mole) |
| | RbOH | 3.07 g | (0.03 mole) |
| | TlI | 0.331 g | (0.001 mole) |
| (114) | CsBr | 212.8 g | (1 mole) |
| | CsOH | 4.50 g | (0.03 mole) |
| | TlBr | 0.284 g | (0.001 mole) |
| (115) | CsI | 259.8 g | (1 mole) |
| | $TlNO_3$ | 0.107 g | (0.0004 mole) |
| (116) | RbBr | 140.6 g | (0.85 mole) |
| | CsBr | 31.92 g | (0.15 mole) |
| | $RbNO_3$ | 2.95 g | (0.02 mole) |
| | TlBr | 0.284 g | (0.001 mole) |
| (117) | RbBr | 140.6 g | (0.85 mole) |
| | CsBr | 31.92 g | (0.15 mole) |
| | $TlNO_3$ | 0.107 g | (0.0004 mole) |

Next, each of the above 32 kinds of stimulable phosphor starting material mixtures was filled in a quartz boat and placed in an electric furnace to carry out calcination.

Calcination was conducted in an inert atmosphere by flowing nitrogen gas at a flow rate of 300 cc/min. at 620° C. for 5 hours, and thereafter the calcined product was left to cool to room temperature.

The calcined product was pulverized by use of a ball mill, then subjected to screening through a sieve of 150 mesh to make the particle sizes uniform to obtain respective stimulable phosphors.

Next, by use of the above 32 kinds of stimulable phosphors, radiographic image storage panels were prepared. Each radiographic image storage panel was prepared as described below.

First, 13 parts by weight of the stimulable phosphor were dispersed in 1 part by weight of a polyvinyl butyral (binder) by use a solvent mixture of butyl acetate and butanol at a weight ratio of 3 : 1, and the dispersion was applied uniformly on a polyethylene terephthalate film (support) placed horizontally by use of a wire bar, followed by natural drying to prepare a radiographic image storage panel with a film thickness of about 300 μm.

The above radiographic image storage panels prepared by use of the phosphors obtained by calcination of the phosphor starting materials of the above (86) to (117) are called panels (86) to (117), respectively.

EXAMPLE 7

The respective phosphor starting materials were weighed as shown below by (118), and then thoroughly mixed by use of a ball mill to compound a stimulable phosphor starting material mixture.

| (118) | RbBr | 165.4 g | (1 mole) |
|---|---|---|---|
| | TlBr | 0.284 g | (0.001 mole) |

A radiographic image storage panel (118) was prepared by conducting the same operation as in the method of Example 6 except for using the stimulable phosphor starting material of the above (118) and calcining in an oxidative atmosphere of a gas mixture comprising 20 vol.% of oxygen gas and 80 vol.% of nitrogen gas.

EXAMPLE 8

By carrying out the same operation as in Example 7 except for using the stimulable phosphor starting material of the above (107), a radiographic image storage panel (119) was prepared.

COMPARATIVE EXAMPLE 1

After the respective phosphor starting materials were weighed as shown below by (120) to (125), they were thoroughly mixed by use of a ball mill to compound 6 kinds of stimulable phosphor starting material mixtures.

| (120) | RbBr | 165.4 g | (1 mole) |
|---|---|---|---|
| | TlBr | 0.284 g | (0.001 mole) |
| (121) | RbI | 212.4 g | (1 mole) |
| | TlI | 0.331 g | (0.001 mole) |
| (122) | KI | 166.0 g | (1 mole) |
| | TlI | 0.331 g | (0.001 mole) |
| (123) | CsBr | 212.8 g | (1 mole) |
| | TlBr | 0.284 g | (0.001 mole) |
| (124) | CsI | 259.8 g | (1 mole) |
| | TlI | 0.331 g | (0.001 mole) |
| (125) | RbBr | 140.6 g | (0.85 mole) |
| | CsBr | 31.92 g | (0.15 mole) |
| | TlBr | 0.284 g | (0.001 mole) |

Except for using the stimulable phosphor starting materials of the above (120) to (125), the same operation as in Example 6 was repeated to prepare radiation image converting panels. They are called panels (120) to (125) respectively corresponding to the above phosphor starting materials (120) to (125).

Next, each radiographic image storage panels of the above (86) to (125) was cut into a test strip with a width of 30 cm, which was placed at a distance of 100 cm from the focus of X-ray bulb, and X-ray of bulb voltage of 80 KVp and bulb current of 100 mA was irradiated for 0.1 sec., and then He-Ne laser beam (632.8 nm, 10 mW) was scanned once for a scanning time of $5 \times 10^{-3}$ sec. in its width direction and the afterglow characteristic of stimulated luminescence was evaluated.

Figure 11:
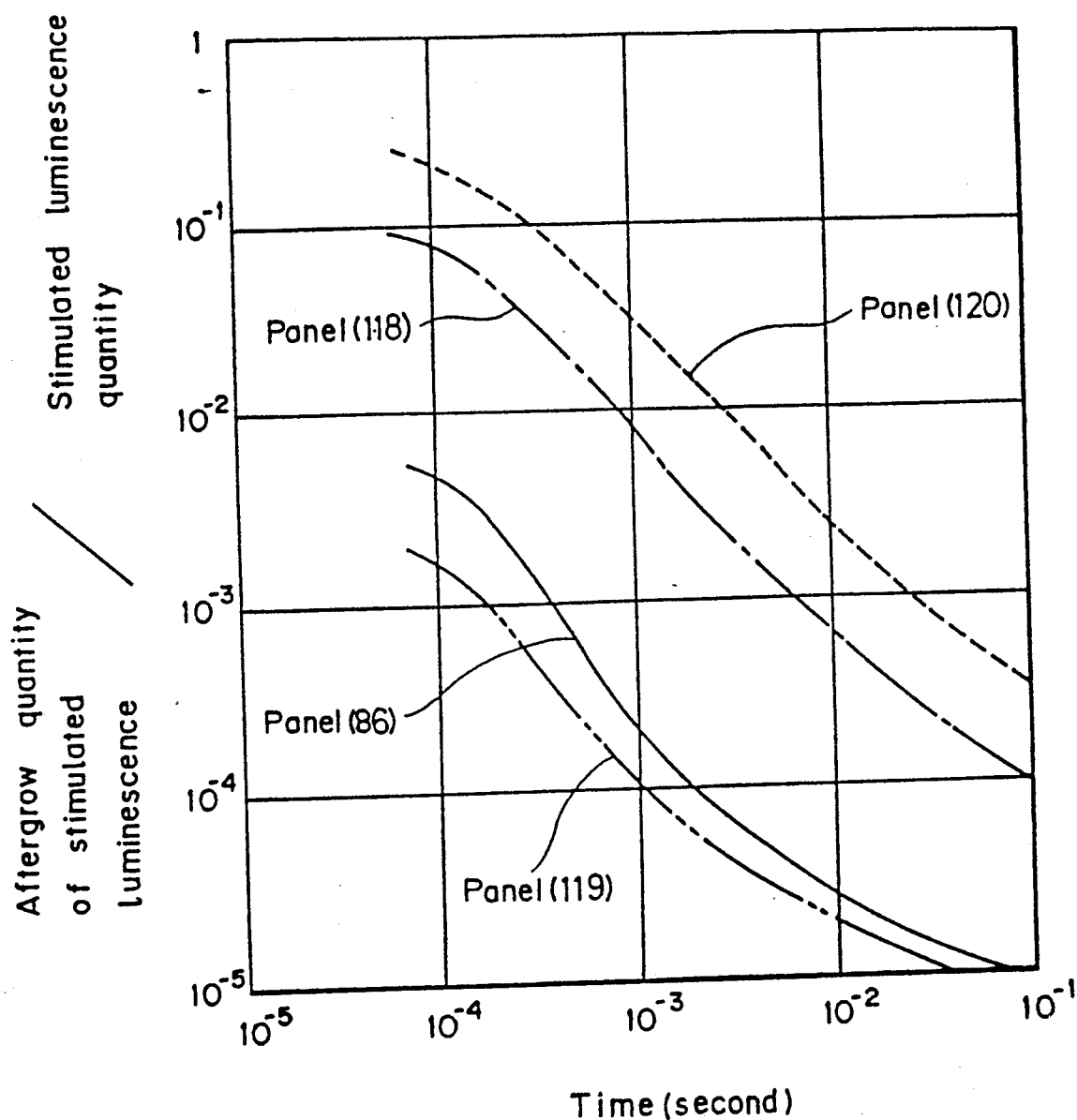
FIG. 11 is a graph showing the stimulated luminescence afterglow characteristic of the radiographic image storage panel (86) comprising the RbBr.0.03RbOH:0.001TlBr of the present invention (solid line), the radiographic image storage panel (118) comprising the RbBr:0.001TlBr of the present invention (chain line), the radiographic image storage panel (119) comprising RbBr.0.03RbOH: 0.0004TlNO₃ of the present invention (chain double-dashed line) and the radiographic image storage panel (120) comprising the RbBr:0.001TlBr phosphor for comparative purpose (dotted line).

For the panels (86), (118), (119), (120), afterglow of stimulated luminescence was attenuated in the manner as shown in FIG. 11. In FIG. 11, the axis of abscissa shows the time after completion of laser scanning and the axis of ordinate the value of [afterglow quantity of stimulated luminescence/stimulated luminescence quantity]. It can be seen that the panel (86) (solid line), the panel (118) (chain line), the panel (119) (chain double-dashed line) are smaller in afterglow as compared with the panel (120) (dotted line).

For the panels (86) to (125), the values of [afterglow quantity of stimulated luminescence/stimulated luminescence quantity] at $1 \times 10^{-4}$ sec. after completion of laser scanning are shown in Table 5. It can be seen that the panels (86) to (119) are smaller in afterglow of stimulated luminescence as compared with the panels (120) to (125).

TABLE 5

| | Composition of phosphor | Afterglow quantity of stimulated luminescence Stimulated luminescence quantity |
|---|---|---|
| Panel (86) | RbBr.0.03RbOH:0.001TlBr | 0.0046 |
| Panel (87) | RbBr.0.05NaOH:0.001TlBr | 0.0094 |
| Panel (88) | RbBr.0.03Na$_2$CO$_3$:0.001TlBr | 0.010 |
| Panel (89) | RbBr.0.05KOH:0.001TlBr | 0.0053 |
| Panel (90) | RbBr.0.02Rb$_2$O:0.001TlBr | 0.0060 |
| Panel (91) | RbBr.0.02Rb$_2$CO$_3$:0.001TlBr | 0.0069 |
| Panel (92) | RbBr.3 $\times$ 10$^{-7}$RbNO$_3$:0.001TlBr | 0.19 |
| Panel (93) | RbBr.4 $\times$ 10$^{-7}$RbNO$_3$:0.001TlBr | 0.18 |
| Panel (94) | RbBr.1 $\times$ 10$^{-6}$RbNO$_3$:0.001TlBr | 0.12 |
| Panel (95) | RbBr.1 $\times$ 10$^{-5}$RbNO$_3$:0.001TlBr | 0.072 |
| Panel (96) | RbBr.0.02RbNO$_3$:0.001TlBr | 0.013 |
| Panel (97) | RbBr.0.04RbNO$_3$:0.001TlBr | 0.0043 |
| Panel (98) | RbBr.0.06RbNO$_3$:0.001TlBr | 0.0017 |
| Panel (99) | RbBr.0.007RbNO$_3$:0.001TlBr | 0.0014 |
| Panel (100) | RbBr.0.15RbNO$_3$:0.001TlBr | 0.0007 |
| Panel (101) | RbBr.0.2RbNO$_3$:0.001TlBr | 0.0005 |
| Panel (102) | RbBr.0.3RbNO$_3$:0.001TlBr | 0.0005 |
| Panel (103) | RbBr.0.02Rb$_2$SO$_4$:0.001TlBr | 0.014 |
| Panel (104) | RbBr.0.02CsOH:0.001TlBr | 0.0083 |
| Panel (105) | RbBr.0.01Cs$_2$CO$_3$:0.001TlBr | 0.0078 |
| Panel (106) | RbBr:0.0004TlNO$_3$ | 0.0027 |
| Panel (107) | RbBr.0.03RbOH:0.0004TlNO$_3$ | 0.0021 |
| Panel (108) | RbBr:0.0005Tl$_2$O | 0.017 |
| Panel (109) | RbBr.0.02Rb$_2$CO$_3$:0.0005Tl$_2$O | 0.0056 |
| Panel (110) | RbBr.0.02SrCO$_3$:0.001TlBr | 0.0088 |
| Panel (111) | RbBr.0.02BaCO$_3$:0.001TlBr | 0.0096 |
| Panel (112) | RbI:0.0004TlNO$_3$ | 0.0073 |
| Panel (113) | KI.0.03RbOH:0.001TlI | 0.017 |
| Panel (114) | CsBr.0.03CsOH:0.001TlBr | 0.023 |
| Panel (115) | CsI:0.0004TlNO$_3$ | 0.0058 |
| Panel (116) | 0.85RbBr.0.15CsBr.0.02RbNO$_3$: 0.001TlBr | 0.014 |
| Panel (117) | 0.85RbBr.0.15CsBr:0.0004TlBr | 0.0041 |
| Panel (118) | RbBr:0.001TlBr | 0.078 |
| Panel (119) | RbBr.0.03RbOH:0.0004TlNO$_3$ | 0.0016 |
| Panel (120) | RbBr:0.001TlBr | 0.21 |
| Panel (121) | RbI:0.001TlI | 0.23 |
| Panel (122) | KI:0.001TlI | 0.41 |
| Panel (123) | CsBr:0.001TlBr | 0.80 |
| Panel (124) | CsI:0.001TlI | 0.34 |
| Panel (125) | 0.85RbBr.0.15CsBr:0.001TlBr | 0.24 |

Phosphors employed in panels (118) and (119) were calcined in oxidative atmosphere.

As explained hereinabove, the present stimulable phosphor can provide a remarkably increased emission luminance by stimulation, when irradiated with radiation and then stimulated and excited with either or both or visible ray and infrared ray, as compared with the prior alkali halide phosphor. Also, the present phosphor may exert an improvement in response characteristics of stimulable emission and afterflow of stimulation, when irradiated with radiation and then stimulated and excited with either or both of visible ray and infrared ray, in comparison with the prior alkali halide phosphor.

Accordingly, the present stimulable phosphor is useful, in particular, as a phosphor for a radiation energy storage panel.

Moreover, the present stimulable phosphor may exert a high sensitivity to radiation and hence, if the present method for converting radiographic image is utilized for X-ray diagnosis and others, an X-ray exposed amount to the subject may be reduced. Further, the present stimulable phosphor has a high response speed to an exciting light and a high elimination speed of accumulated energy (i.e., afterglow), so that the present method for converting radiographic image may provide a higher reading speed on radiation image and a more reduced time for eliminating after image, which leads to enhanced working efficiency of the system. Still further, a stimulable excited spectrum by the present stimulable phosphor may be extended to an oscillating wave region of a semi-conductor laser so that excitation with a semi-conductor laser may be feasible, whereby a reading apparatus for radiation image may be miniaturized and simplified with a more reduced cost. And, the present stimulable phosphor has a superior water vapor resistance and thus reduction in emission luminance by stimulation with lapse of time may be greatly improved.

We claim:

1. A method of converting a radiographic image which comprises the steps of:
    (a) storing radiation energy-corresponding to a radiographic image in a stimulable phosphor of a panel comprising a stimulable phosphor-containing layer,
    (b) scanning said layer with a stimulating ray to release said stored energy as a fluorescence, and
    (c) detecting said fluorescence to form an image, wherein said stimulable phosphor is represented by the following formula:

$$(M_{1-\chi} \cdot M^I_\chi)X \cdot aM^{II}X'_2 \cdot bM^{III}X''_3 : dB$$

wherein M represents either Cs or Rb; $M^I$ represents at least one of alkaline metals selected from the group consisting of Li, Na, K, Rb and Cs; $M^{II}$ represents at least one divalent metal selected from the group consisting of Be, Mg, Ca, Sr, Ba, Zn, Cd, Cu and Ni; $M^{III}$ represents at least one metal selected from the group consisting of Sc, Y, La, Ce, Pr, Nd, Pm, Sm, Eu, Gd, Tb, Dy, Ho, Er, Tm, Yb, Lu, Al, Ga and In; B is an activator which is at least one metal selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn and In; X, X' and X" each are the same or different and represent a halogen atom selected from F, Cl, Br and I; provided that all of the X' atoms are the same halogen atoms; and $\chi$, a, b and d are numerals in the range of $0 \leq \chi \leq 1$, $0 \leq a \leq 1$, $0 \leq b \leq 0.5$ and $0 < d \leq 0.2$, respectively.

2. The method of converting a radiographic image of claim 1, wherein said $\chi$ is 1.

3. The method of converting a radiographic image of claim 2, wherein said b is in the range of $0 \leq b \leq 1 \times 10^{-2}$.

4. The method of converting a radiographic image of claim 3, wherein said $M^{III}$ is selected from Y, La, Sm, Gd, Lu, Al, Ga and In.

5. The method of converting a radiographic image of claim 4, wherein said X" is selected from F, Cl and Br.

6. The method of converting a radiographic image of claim 2, wherein said $M^{II}$ is selected from Be, Mg, Ca, Sr and Ba.

7. The method of converting a radiographic image of claim 2, wherein said $M^I$ includes at least Rb or Cs.

8. The method of converting a radiographic image of claim 7, wherein said B is selected from Tl, Na, Ag and Cu.

9. The method of converting a radiographic image of claim 3, wherein said d is in the range of $1 \times 10^{-6} \leq d \leq 0.1$.

10. The method of converting a radiographic image of claim 1, wherein said $\chi$ is in the range of $0 \leq \chi < 0.9$ and said B comprises Tl.

11. The method of converting a radiographic image of claim 1, wherein said stimulating ray is a semiconductor laser.

12. A radiation energy storage panel having a stimulable phosphor-containing layer characterized in that said stimulable phosphor is represented by the following formula:

$$(M_{1-\chi} \cdot M^I_\chi)X \cdot aM^{II}X'_2 \cdot bM^{III}X''_3 : dB$$

wherein M represents either Cs or Rb; $M^I$ represents at least one of alkaline metals selected from the group consisting of Li, Na, K, Rb and Cs; $M^{II}$ represents at least one divalent metal selected from the group consisting of Be, Mg, Ca, Sr, Ba, Zn, Cd, Cu and Ni; $M^{III}$ represents at least one metal selected from the group consisting of Sc, Y, La, Ce, Pr, Nd, Pm, Sm, Eu, Gd, Tb, Dy, Ho, Er, Tm, Yb, Lu, Al, Ga and In; B i.s an activator which is at least one metal selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn and In; X, X' and X" each are the same or different and represent a halogen atom selected from F, Cl, Br and I; provided that all of the X' atoms are the same halogen atoms; and $\chi$, a, b and d are numerals in the range of $0 \leq \chi \leq 1$, $0 \leq a \leq 1$, $0 \leq b \leq 0.5$ and $0 < d \leq 0.2$, respectively.

13. The radiation energy storage panel having a stimulable phosphor-containing layer of claim 12, wherein said X is 1.

14. The radiation energy storage panel having a stimulable phosphor-containing layer of claim 13, wherein said b is in the range of $0 \leq b \leq 1 \times 10^{-2}$.

15. The radiation energy storage panel having a stimulable phosphor-containing layer of claim 14, wherein said $M^{III}$ is selected from Y, La, Sm, Gd, Lu, Al, Ga and In.

16. The radiation energy storage panel having a stimulable phosphor-containing layer of claim 15, wherein said X" is selected from F, Cl and Br.

17. The radiation energy storage panel having a stimulable phosphor-containing layer of claim 13, wherein said $M^{II}$ is selected from Be, Mg, Ca, Sr and Ba.

18. The radiation energy storage panel having a stimulable phosphor-containing layer of claim 13, wherein said $M^I$ includes at least Rb or Cs.

19. The radiation energy storage panel having a stimulable phosphor-containing layer of claim 18, wherein said B is selected from Tl, Na, Ag and Cu.

20. The radiation energy storage panel having a stimulable phosphor-containing layer of claim 14, wherein said d is in the range of $1 \times 10^{-6} \leq d \leq 0.1$.

21. The radiation energy storage panel having a stimulable phosphor-containing layer of claim 12, wherein said $\chi$ is in the range of $0 \leq \chi < 0.9$ and said B comprises Tl.

22. A method of converting a radiographic image which comprises the steps of:

(a) storing radiation energy-corresponding to a radiographic image in a stimulable phosphor of a panel comprising a stimulable phosphor-containing layer, (b) scanning said layer with a stimulating ray to release said stored energy as a fluorescence, and (c) detecting said fluorescence to form an image, wherein said stimulable phosphor is represented by the following formula;

$$(M_{1-x} \cdot M^I_x)X \cdot aM^{II}X'_2 \cdot bM^{III}X''_3 : dB$$

wherein M represents either Cs or Rb; $M^I$ represents at least one of alkaline metals selected from the group consisting of Li, Na, K, Rb and Cs; $M^{II}$ represents at least one divalent metal selected from the group consisting of Be, Mg, Ca, Sr, Ba, Zn, Cd, Cu and Ni; $M^{III}$ represents at least one metal selected from the group consisting of Sc, Y, La, Ce, Pr, Nd, Pm, Sm, Eu, Cd, Tb, Dy, Ho, Er, Tm, Yb, Lu, Al, Ga and In; B is an activator which is at least one metal selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn and In; X, X' and X'' each are the same or different and represent a halogen atom selected from F, Cl, Br and I; provided that all of the X' atoms are different halogen atoms; and x, a, b and d are numerals in the range of $0 \leq x \leq 1$, $0 \leq a \leq 0.4$, $0 \leq b \leq 0.5$ and $0 < d \leq 0.2$, respectively.

23. The method of converting a radiographic image of claim 22, wherein $0 \leq b \leq 10^{-2}$ and $10^{-6} \leq d \leq 0.1$.

24. The method of converting a radiographic image of claim 22, wherein said d is in the range of $10^{-6} \leq d \leq 0.1$.

25. The method of converting a radiographic image of claim 22, wherein B is selected from the group consisting of Tl, Na, Ag, Cu and In.

26. The method of converting a radiographic image of claim 24, wherein B is selected from the group consisting of Tl, Na, Ag, Cu and In.

27. The method of converting a radiographic image of claim 22, wherein said stimulating ray is a semiconductor laser.

28. A radiation energy storage panels having a stimulable phosphor-containing layer wherein said stimulable phosphor is represented by the following formula:

$$(M_{1-x} \cdot M^I_x)X \cdot aM^{II}X'_2 \cdot bM^{III}X''_3 : dB$$

wherein M represents either Cs or Rb; $M^I$ represents at least one of alkaline metals selected from the group consisting of Li, Na, K, Rb and Cs; $M^{II}$ represents at least one divalent metal selected from the group consisting of Be, Mg, Ca, Sr, Ba, Zn, Cd, Cu and Ni; $M^{III}$ represents at least one metal selected from the group consisting of Sc, Y, La, Ce, Pr, Nd, Pm, Sm, Eu, Cd, Tb, Dy, Ho, Er, Tm, Yb, Lu, Al, Ga and In; B is an activator which is at least one metal selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn and In; X, X' and X'' each are the same or different and represent a halogen atom selected from F, Cl, Br and I; provided that all of the X' atoms are different halogen atoms; and x, a, b and d are numerals in the range of $0 \leq x \leq 1$, $0 \leq a \leq 0.4$, $0 \leq b \leq 0.5$ and $0 < d \leq 0.2$, respectively.

29. The radiation energy strage panel having a stimulable phosphor-containing layer of claim 28, wherein $0 \leq b \leq 10^{-2}$ and $10^{-6} \leq d \leq 0.1$.

30. The radiation energy strage panel having a stimulable phosphor-containing layer of claim 28, wherein said d is in the range of $10^{-6} \leq d \leq 0.1$.

31. The radiation energy strage panel having a stimulable phosphor-containing layer of claim 28, wherein B is selected from the group consisting of Tl, Na, Ag, Cu and In.

32. The radiation energy strage panel having a stimulable phosphor-containing layer of claim 30, wherein B is selected from the group consisting of Tl, Na, Ag, Cu and In.

33. A method of converting a radiographic image which comprises the steps of:

(a) storing radiation energy-corresponding to a radiographic image in a stimulable phosphor of a panel comprising a stimulable phosphor-containing layer, (b) scanning said layer with a stimulating ray to release said stored energy as a fluorescence, and (c) detecting said fluorescence to form an image, wherein said stimulable phosphor is an alkali halide phosphor essentially free of Eu as an activator, wherein said alkali halide phosphor contains oxygen.

34. A method of converting a radiographic image which comprises the steps of:

(a) storing radiation energy-corresponding to a radiographic image in a stimulable phosphor of a panel comprising a stimulable phosphor-containing layer, (b) scanning said layer with a stimulating ray to release said stored energy as a fluorescence, and (c) detecting said fluorescence to form an image, wherein said stimulable phosphor is an alkali halide phosphor contains oxygen containing an activator which is at least one metal selected from the group consisting of Tb, Ce, Tm, Dy, Pr, Ho, Nd, Yb, Er, Gd, Lu, Sm, Y, Tl, Na, Ag, Cu, Mg, Pb, Bi, Mn and In, wherein said alkali halide phosphor contains oxygen.

35. The method of converting a radiographic image of claim 34, wherein said oxygen is contained as an oxygen compound.

36. The method of converting a radiographic image of claim 34, wherein the content of said oxygen per one mole of an alkali halide contained in said alkali halide phosphor is 0.5 mole or less.

37. The method of converting a radiographic image of claim 34, wherein the content of said oxygen per one mole of an alkali halide contained in the alkali halide phosphor is from $10^{-6}$ mole to 0.2 mole.

38. The method of converting a radiographic image of claim 34, wherein an alkali halide phosphor contained in the alkali halide contains at least one of Rb and Cs.

39. The method of converting a radiographic image of claim 34, wherein said alkali halide phosphor contains at least one metal selected from the group consisting of Tl, Na, Ag, Cu and In as the activator.

40. The method of converting a radiographic image of claim 34, wherein said stimulating ray is a semiconductor laser.

41. The method of converting a radiographic image of claim 33, wherein said alkali halide phosphor is represented by the formula:

$$M^I X \cdot aM^{II}X'_2 \cdot bM^{III}X''_3 \cdot cA : dB$$

wherein $M^I$ is at least one alkali metal selected from Li, Na, K, Rb and Cs; $M^{II}$ is at least one divalent metal selected from Be, Mg, Ca, Sr, Ba, Zn, Cd, Cu and Ni; $M^{III}$ is at least one trivalent metal selected from Sc, Y, La, Ce, Pr, Nd, Pm, Sm, Eu, Gd, Tb, Dy, Ho, Er, Tm, Yb, Lu, Al, Ga and In; X, X' and X" each represent at least one halogen selected from F, Cl, Br and I; A is a compound having a composition containing oxygen; B is an activator which is one metal compound of the metal selected from Tb, Ce, Tm, Dy, Pr, Ho, Nd, Yb, Er, Gd, Lu, Sm, Y, Tl, Na, Ag, Cu, In and Mg or said metal; a is a numerical value in the range of $0 \leq a < 0.5$; b is a numerical value in the range of $0 \leq b < 0.5$; c is a numerical value in the range of $0 \leq c \leq 0.5$; and d is a numerical value in the range of $0 < d \leq 0.2$.

42. The method of converting a radiographic image of claim 41, wherein said c is a numerical value which is determined so that the content of at least one of the oxygen atoms and oxygen ions contained in A may be 0.5 mole or less per 1 mole of an alkali halide in the alkali halide phosphor.

43. The method of converting a radiographic image of claim 41, wherein said A represents at least one metal oxide selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZnO_2$, $GeO_2$, $SnO_2$, $Nb_2O_5$, $Ta_2O_5$ and $ThO_2$.

44. The method of converting a radiographic image of claim 41, wherein a is a numerical value in the range of $0 \leq a < 0.4$; b is a numerical value in the range of $0 \leq b < 10^{-2}$; c is a numerical value which is determined so that the content of at least one of the oxygen atoms and oxygen ions contained in A may be in the range of from $10^{-6}$ to 0.2 per 1 mole of an alkali halide in the alkali halide phosphor; and d is a numerical value in the range of $10^{-6} \leq d \leq 0.1$.

45. The method of converting a radiographic image of claim 41, wherein said stimulating ray is a semiconductor laser.

46. The method of converting a radiographic image of claim 34, wherein said alkali halide phosphor containing oxygen is prepared by carrying out calcination by use of a compound containing oxygen as a part of phosphor starting material.

47. The method of converting a radiographic image of claim 46, wherein said compound containing oxygen is at least one selected from the group consisting of hydroxides, carbonates, sulfates, nitrates and oxides.

48. The method of converting a radiographic image of claim 47, wherein said compound containing oxygen is at least one selected from the group consisting of KOH, $Na_2CO_3$, $Rb_2SO_4$, $CsNO_3$, $Rb_2O$ and $RbNO_3$.

49. A radiation image storage panel having a stimulable phosphor-containing layer, wherein said stimulable phosphor is an alkali halide phosphor containing oxygen and an activator which is at least one metal selected from the group consisting of Tb, Ce, Tm, Dy, Pr, Ho, Nd, Yb, Er, Gd, Lu, Sm, Y, Tl, Na, Ag, Cu, Mg, Pb, Bi, Mn and In.

50. The radiation image storage panel having a stimulable phosphor-containing layer of claim 49, wherein said oxygen is contained as an oxygen compound.

51. The radiation image storage panel having a stimulable phosphor-containing layer of claim 49, wherein the content of said oxygen per one mole of an alkali halide contained in said alkali halide phosphor is 0.5 mole or less.

52. The radiation image storage panel having a stimulable phosphor-containing layer of claim 49, wherein the content of said oxygen per one mole of an alkali halide contained in the alkali halide phosphor is from $10^{-6}$ mole to 0.2 mole.

53. The radiation image storage panel having a stimulable phosphor-containing layer of claim 49, wherein an alkali halide phosphor contained in the alkali halide contains at least one of Rb and Cs.

54. The radiation image storage panel having a stimulable phosphor-containing layer of claim 49, wherein said alkali halide phosphor contains at least one selected from the group consisting of the respective compounds of Tl, Na, Ag, Cu and In as the activator.

55. The radiation image storage panel having a stimulable phosphor-containing layer of claim 49, wherein said alkali halide phosphor is represented by the formula:

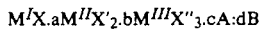

$$M^I X . a M^{II} X'_2 . b M^{III} X''_3 . cA : dB$$

wherein $M^I$ is at least one alkali metal selected from Li, Na, K, Rb and Cs; $M^{II}$ is at least one divalent metal selected from Be, Mg, Ca, Sr, Ba, Zn, Cd, Cu and Ni; $M^{III}$ is at least one trivalent metal selected from Sc, Y, La, Ce, Pr, Nd, Pm, Sm, Eu, Gd, Tb, Dy, Ho, Er, Tm, Yb, Lu, Al, Ga and In; X, X' and X" each represent at least one halogen selected from F, Cl, Br and I; A is a compound having a composition containing oxygen; B is an activator which is one metal compound of the metal selected from Tb, Ce, Tm, Dy, Pr, Ho, Nd, Yb, Er, Gd, Lu, Sm, Y, Tl, Na, Ag, Cu, In and Mg or said metal; a is a numerical value in the range of $0 \leq a < 0.5$; b is a numerical value in the range of $0 \leq b < 0.5$; c is a numerical value in the range of $0 \leq c < 0.5$; and d is a numerical value in the range of $0 < d \leq 0.2$.

56. The radiation image storage panel having a stimulable phosphor-containing layer of claim 55, wherein said c is a numerical value which is determined so that the content of at least one of the oxygen atoms and oxygen ions contained in A is 0.5 mole or less per 1 mole of an alkali halide in the alkali halide phosphor.

57. The radiation image storage panel having a stimulable phosphor-containing layer of claim 55, wherein said A represents at least one metal oxide selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZnO_2$, $GeO_2$, $SnO_2$, $Nb_2O_5$, $Ta_2O_5$ and $ThO_2$.

58. The radiation image storage panel having a stimulable phosphor-containing layer of claim 55, wherein a is a numerical value in the range of $0 \leq a < 0.4$; b is a numerical value in the range of $0 \leq b < 10^{-2}$; c is a numerical value which is determined so that the content of at least one of the oxygen atoms and oxygen ions contained in A is in the range of from $10^{-6}$ to 0.2 per 1 mole of an alkali halide in the alkali halide phosphor; and d is a numerical value in the range of $10^{-6} \leq d \leq 0.1$.

59. The radiation image storage panel having a stimulable phosphor-containing layer of claim 49, wherein said alkali halide phosphor containing oxygen is prepared by carrying out calcination by use of a compound containing oxygen as a part of phosphor starting material.

60. The radiation image storage panel having a stimulable phosphor-containing layer of claim 59, wherein said compound containing oxygen is at least one selected from the group consisting of hydroxides, carbonates, sulfates, nitrates and oxides.

61. The radiation image storage panel having a stimulable phosphor-containing layer of claim 60, wherein said compound containing oxygen is at least one selected from the group consisting of KOH, $Na_2CO_3$, $Rb_2SO_4$, $CsNO_3$, $Rb_2O$ and $RbNO_3$.

62. The method of converting a radiographic image of claim 22, 33, 34, 35, 36, 37, 38, 39, 40, 41, 42, 43, 44, 45, 46, 47 or 48, wherein said alkali halide phosphor is prepared by carrying out calcination under oxidative atmosphere.

63. The radiation energy storage panel having stimulable phosphor-containing layer of claim 12, 23, 49, 50, 51, 52, 53, 54, 55, 56, 57, 58, 59, 60 or 61, wherein said alkali halide phosphor is prepared by carrying out calcination under oxidative atmosphere.

64. A method of converting a radiographic image which comprises the steps of:
(a) storing radiation energy-corresponding to a radiographic image in a stimulable phosphor of a panel comprising a stimulable phosphor-containing layer,
(b) scanning said layer with a stimulating ray to release said stored energy as a fluorescence, and
(c) detecting said fluorescence to from an image, wherein said stimulable phosphor is an alkali halide phosphor, wherein said alkali halide phosphor is prepared by carrying out calcination under oxidative atmosphere.

65. A radiation energy storage having a stimulable phosphor-containing layer, wherein said stimulable phosphor is an alkali halide phosphor prepared by carrying out calcination under oxidative atmosphere.

* * * * *

UNITED STATES PATENT AND TRADEMARK OFFICE
CERTIFICATE OF CORRECTION

PATENT NO. : 5,028,509

DATED : July 2, 1991

INVENTOR(S) : SHIMADA et al

It is certified that error appears in the above-identified patent and that said Letters Patent is hereby corrected as shown below:

On the title page, Item [56] References Cited, under "FOREIGN PATENT DOCUMENTS", delete one entry of reference "1295615 5/1962 France".

Signed and Sealed this

First Day of June, 1993

*Attest:*

MICHAEL K. KIRK

*Attesting Officer*      *Acting Commissioner of Patents and Trademarks*